(12) United States Patent
Fujii

(10) Patent No.: US 7,590,349 B2
(45) Date of Patent: Sep. 15, 2009

(54) NODE DEVICE, OPTICAL COMMUNICATION NETWORK, OPTICAL PATH RESERVE METHOD AND COMPUTER-READABLE MEDIUM COMPRISING A PROGRAM

(75) Inventor: Akihiro Fujii, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 458 days.

(21) Appl. No.: 11/607,926

(22) Filed: Dec. 4, 2006

(65) Prior Publication Data
US 2007/0127917 A1 Jun. 7, 2007

(30) Foreign Application Priority Data
Dec. 5, 2006 (JP) ............................. 2005-351328

(51) Int. Cl.
*H04B 10/00* (2006.01)
*H04J 14/00* (2006.01)
(52) U.S. Cl. ........................................................ 398/5
(58) Field of Classification Search ................. 398/1–8
See application file for complete search history.

(56) References Cited
U.S. PATENT DOCUMENTS
7,274,869 B1 * 9/2007 Pan ................................ 398/5

7,447,430 B2 * 11/2008 Nogi et al. ...................... 398/5
2004/0223762 A1 * 11/2004 Lee et al. ....................... 398/51

FOREIGN PATENT DOCUMENTS
JP  2002-261791  9/2002
JP  2003-235060  8/2003

* cited by examiner

Primary Examiner—Quan-Zhen Wang
(74) Attorney, Agent, or Firm—Venable LLP; James R. Burdett

(57) ABSTRACT

The present invention suppresses an increase of processing time caused by the expansion of network scale, and decreases the probability of occurrence of blocking by reserving optical paths based on the distributed control method, and decreases time to complete the reservation of optical paths. When an optical path is set from a start point node device to an end point node device via a relay node device, a reserve packet receive step, destination node setting step, transmission possibility judgment step, reserve packet update step, and reserve packet transmission step are executed. When a reserve failure packet is received from a destination node device of a reserve packet, this destination node device is regarded as a transmission impossible node device, and a destination node setting step, transmission possibility judgment step, reserve packet update step and reserve packet transmission step are further executed, and if there is not a transmission possible node device, a reserve failure packet is generated, and the reserve failure packet is sent to the transmission source of the reserve packet.

18 Claims, 18 Drawing Sheets

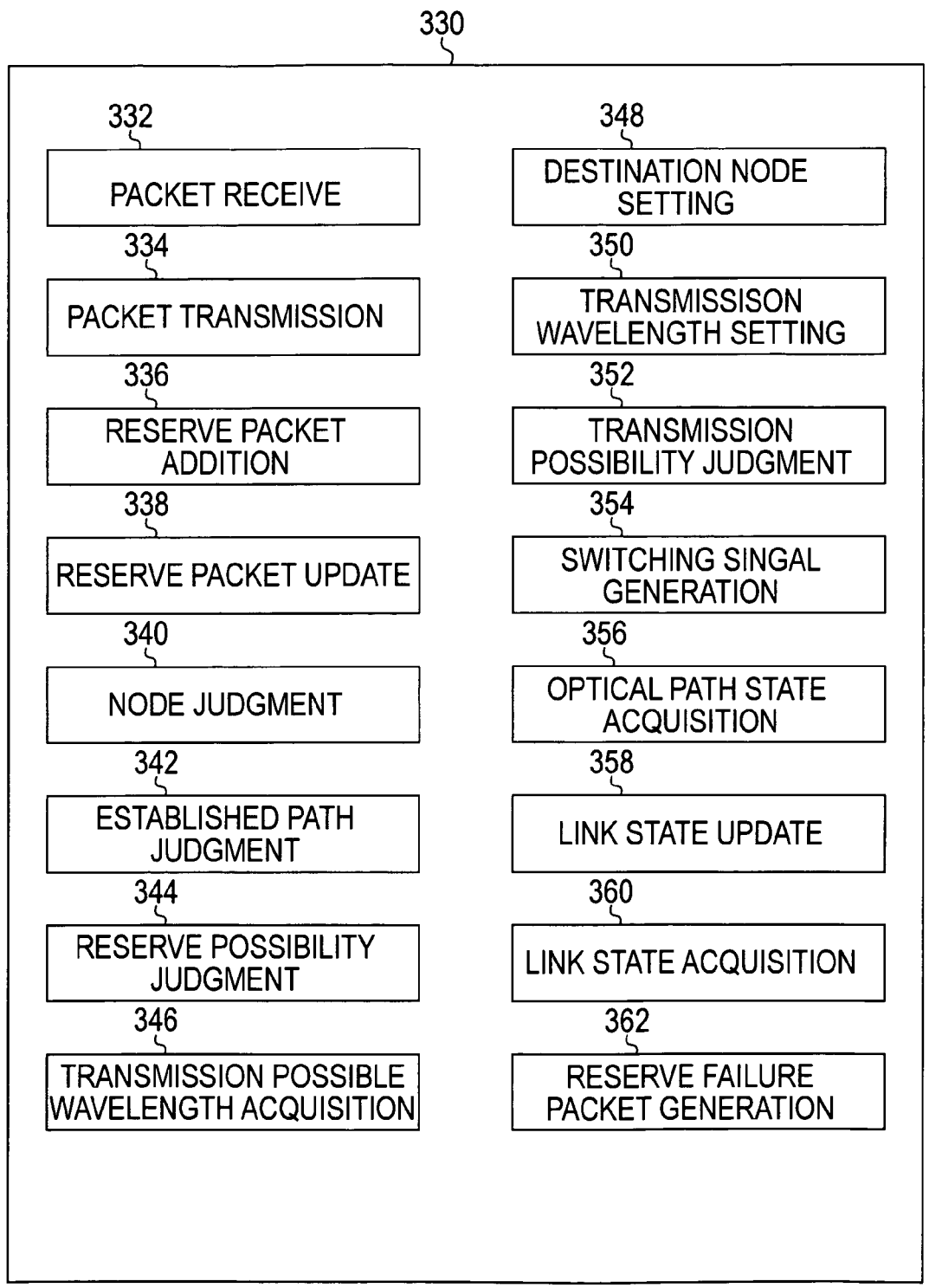

| | DESTINATION NODE | | | | | | | | |
|---|---|---|---|---|---|---|---|---|---|
| | | 1 | 2 | 3 | 4 | 5 | 6 | 7 | 8 | 9 |
| TRANSMISSION SOURCE NODE | 1 | 0 | 1 | 0 | 4 | 0 | 0 | 0 | 0 | 0 |
| | 2 | 1 | 0 | 2 | 0 | 3 | 0 | 0 | 0 | 0 |
| | 3 | 0 | 2 | 0 | 0 | 0 | 3 | 0 | 0 | 0 |
| | 4 | 4 | 0 | 0 | 0 | 2 | 0 | 3 | 0 | 0 |
| | 5 | 0 | 3 | 0 | 2 | 0 | 4 | 0 | 5 | 0 |
| | 6 | 0 | 0 | 3 | 0 | 4 | 0 | 0 | 0 | 1 |
| | 7 | 0 | 0 | 0 | 3 | 0 | 0 | 0 | 1 | 0 |
| | 8 | 0 | 0 | 0 | 0 | 5 | 0 | 1 | 0 | 2 |
| | 9 | 0 | 0 | 0 | 0 | 0 | 1 | 0 | 2 | 0 |

| N1 | | |
|---|---|---|
| NODE ID | FIBER ID | WAVELENGTH ID |
| 2 | 1 | 1,4 |
| 4 | 5 | 3,4 |

(B)

| N2 | | |
|---|---|---|
| NODE ID | FIBER ID | WAVELENGTH ID |
| 1 | 2 | 3,4 |
| 3 | 3 | 0 |
| 5 | 7 | 1,4 |

(C)

| N3 | | |
|---|---|---|
| NODE ID | FIBER ID | WAVELENGTH ID |
| 2 | 4 | 0 |
| 6 | 9 | 2,4 |

(D)

| N4 | | |
|---|---|---|
| NODE ID | FIBER ID | WAVELENGTH ID |
| 1 | 6 | 2,4 |
| 5 | 11 | 1 |
| 7 | 15 | 4 |

(E)

| N5 | | |
|---|---|---|
| NODE ID | FIBER ID | WAVELENGTH ID |
| 2 | 8 | 1,4 |
| 4 | 12 | 4 |
| 6 | 13 | 1,4 |
| 8 | 17 | 1 |

(F)

| N6 | | |
|---|---|---|
| NODE ID | FIBER ID | WAVELENGTH ID |
| 3 | 10 | 1,3 |
| 5 | 14 | 1,2 |
| 9 | 19 | 1,4 |

(G)

| N7 | | |
|---|---|---|
| NODE ID | FIBER ID | WAVELENGTH ID |
| 4 | 16 | 1 |
| 8 | 21 | 3 |

(H)

| N8 | | |
|---|---|---|
| NODE ID | FIBER ID | WAVELENGTH ID |
| 5 | 18 | 4 |
| 7 | 22 | 4 |
| 9 | 23 | 2,3 |

(I)

| N9 | | |
|---|---|---|
| NODE ID | FIBER ID | WAVELENGTH ID |
| 6 | 20 | 1,3 |
| 8 | 24 | 2,4 |

NODE DEVICE, OPTICAL COMMUNICATION NETWORK, OPTICAL PATH RESERVE METHOD AND COMPUTER-READABLE MEDIUM COMPRISING A PROGRAM

BACKGROUND OF THE INVENTION

1. Field of the Invention

The present invention relates to a node device for reserving an optical path in an optical communication network using wavelength division multiplexing by a distributed control method, an optical communication network comprising this node device, an optical path reserve method, and a computer-readable medium comprising a program thereof.

2. Description of Related Art

Communication demands are rapidly increasing lately due to the spread of the Internet and other reasons. To support these demands, high-speed and large capacity optical communication networks using optical fibers are being organized. WDM (Wavelength Division Multiplexing) is receiving attention as a technology used for these optical communication networks. WDM is a technology to multiplex optical signals of which carriers have different wavelengths. By using WDM, a plurality of carriers can be propagated through one optical transmission line in parallel. Therefore large capacity optical communication networks can be constructed at low cost.

An optical communication network using WDM comprises a plurality of node devices and optical transmission lines. Each node device has a router. An optical transmission line is an optical fiber, and connects the node devices. In an optical communication network using WDM, each node device has a means to implement OADM (Optical Add Drop Multiplexer) and OXC (Optical Cross-Connect) functions. OADM is a function to multiplex a carrier having another wavelength into optical signal which has been wavelength-multiplexed by WDM, or to demultiplex a carrier having a specific wavelength from optical signal which has been wavelength-multiplexed by WDM. OXC is a function to switch the propagation paths of a carrier which has been wavelength-multiplexed by WDM in wavelength units. By using these functions, an optical paths layout comprised of a plurality of optical paths, that is, a logical topology, can be constructed on an optical communication network comprised of node devices and optical transmission lines, that is a physical topology.

A method for recovering communication status when a communication is interrupted by failure or congestions in an optical communication network using WDM has been provided. According to this method, an optical path in which communication is being interrupted is avoided by dynamically changing the optical path layout. To change the optical path layout, a failure or congestion block is detoured, or the node device where congestion occurred is cut-through. "Cut-through" here means allowing optical signals to pass through the node device using only OADM or OXC, without using the routing function of this node device. By setting a cut-through path in the node device where congestion occurred so as not to use the routing function, the processing load of this node device can be decreased.

A method for setting a cut-through path in an optical communication network is either a centralized control method (e.g. Japanese Patent Application Laid-Open No. 2002-261791) or a distributed control method (e.g. Japanese Patent Application Laid-Open No. 2003-235060).

In the case of the central control method disclosed in Japanese Patent Application Laid-open NO. 2002-261791, a centralized control device receives network resource information from all the node devices belonging to the optical communication network, reserves optical paths using this network resource information, then sends control signals to each node device to set optical paths. Therefore the processing load in the centralized control device increases if the number of node devices increases and the network scale is expanded. An increase in the processing load in a centralized control device may increase the processing time required until path setting completes.

In the case of the distributed control method disclosed in Japanese Patent Application Laid-Open No. 2003-235060, on the other hand, available wavelengths are reserved by transmitting/receiving wavelength reserve signals between node devices on a predetermined physical path, and an optical path is set using this wavelength. According to this distributed control method, an increase of processing time due to an expansion of the network scale, which is the problem of the above mentioned centralized control method, can be suppressed.

In the case of the distributed control method disclosed in Japanese Patent Application Laid-Open No. 2003-235060, however a blocking, which is a phenomena in which a wavelength cannot be reserved if there is no available wavelength to reserve on this predetermined physical path, occurs. If blocking occurs, a wavelength is reserved after other physical paths are determined, so the time required until path setting completes may become long.

After devoted study, the inventor related to this application discovered that optical paths can be efficiently reserved if the selection of paths and selection of wavelengths on the selected paths are performed simultaneously in path setting by the distributed control method.

With the foregoing in view, it is a first object of the present invention to provide a node device which can suppress the increase of processing time due to the expansion of the network scale by reserving optical paths by a distributed control method in the optical communication network using WDM, and can decrease the time until reserving optical paths completes by deceasing the probability of the occurrence of blocking. It is a second object of the present invention to provide an optical communication network comprising this node device. It is a third object of the present invention to provide an optical path reserve method which can suppress the increase of processing time due to expansion of the network scale by reserving optical paths by a distributed control method in the optical communication network using WDM, and can decrease the time until reserving optical paths completes by decreasing the probability of the occurrence of blocking. It is a fourth object of the present invention to provide a program which executes this optical path reserve method.

SUMMARY OF THE INVENTION

According to a first aspect of the present invention, there is provided a node device, in an optical communication network, which comprises a plurality of node devices including a start point node device, a relay node device, and an end point node device, optical fibers connecting adjacent node devices for transmitting wavelength multiplexed signals, and a management device connected to each of the plurality of node devices for generating reserve packets, and in which an optical path is set from the start point node device to the end point node device via the relay node device. This node device comprises an input section, an optical path switching section, and output section and a control section.

When this node device is referred to as a self node device, an input section demultiplexes input wavelength multiplexed signals which are input from an adjacent node device, which is adjacent to the self node device, into each wavelength so as to generate a plurality of single wavelength signals, and sends each of the single wavelength signals to the optical path switching section. Responding to an optical path switching signal received from the control section, the optical path switching section switches an optical path to a destination node device, which is the adjacent node device, for each of the single wavelength signals, and sends each of the single wavelength signals to the output section. The output section multiplexes each of the single wavelength signals which have been sent from the optical path switching section to a common destination node device, so as to generate an output wavelength multiplexed signal, and sends the output wavelength multiplexed signal to the common destination node device.

The control section has a storage section, packet receive means, destination node setting means, transmission possibility judgment means, reserve packet update means, reserve failure packet generation means, packet transmission means and switching signal generation means. In the storage section, a cost matrix is recorded, and a link state table is also recorded. The cost matrix indicates a transmission cost between the self node device and each node device adjacent to the self node device. The link state table indicates an optical fiber between the self node device and each adjacent node device, whether transmission is being performed or not in the optical fiber, and a wavelength being used for transmission.

The packet receive means receives a reserve packet, or a reserve failure packet, from the adjacent node device, to be stored in the storage section. The reserve packet includes information on the start point node device, end point node device, transmission wavelength and transit node device.

The destination node setting means refers to the information on the stored reserve packet, judges the start point node device, transit node device and transmission source node device of the reserve failure packet as transmission impossible node devices, and judges the rest as transmission possible node devices. The destination node setting means refers to the cost matrix, and stores the transmission possible node device of which the transmission cost is lowest in the storage section as a tentative destination node device.

The transmission possibility judgment means refers to the link state table on an optical fiber connected to the tentative destination node device, and judges it as transmission possible if the transmission wavelength of the reserve packet is not in use. If the transmission wavelength of the reserve packet is in use, on the other hand, the transmission possibility judgment means judges it as transmission impossible, and updates the tentative destination node device stored in the storage section to a transmission impossible node device.

The reserve packet update means adds information of the relay node device to the information of a transit node device of the reserve packet stored in the storage section so as to update the reserve packet in response to the judgment as transmission possible.

If the transmission possible node device does not exist in the judgment by the destination node setting means, the reserve failure packet generation means generates a new reserve failure packet which is different from the reserve failure packet stored in the storage section. If the updated reserve packet exists, the packet transmission means reads the updated reserve packet from the storage section, and sends it to the tentative destination node device. If a new reserve failure packet is generated, the packet transmission means sends the new reserve failure packet to the reserve packet transmission source. The switching signal generation means generates the optical path switching signal in response to the reception of a path setting signal generated by the management device, and sends the optical path switching signal to the optical path switching section.

According to the second aspect of the present invention, there is provided a node device, in an optical communication network, which comprises a plurality of node devices including a start point node device, a relay node device, and an end point node device, optical fibers connecting adjacent node devices for transmitting wavelength multiplexed signals, and a management device connected to each of the plurality of node devices for generating reserve packets, and in which an optical path is set from the start point node device to the end point node device via the relay node device. This node device comprises an input section, an optical path switching section, an output section, a relay section and a control section.

When this node device is referred to as a self node device, an input section demultiplexes input wavelength multiplexed signals which are input from an adjacent node device, which is adjacent to the self node device, into each wavelength so as to generate a plurality of single wavelength signals, and sends each of the single wavelength signals to the optical path switching section.

In response to a termination switching signal received from the control section, the optical path switching section switches the state to one of two states, that are a termination state and a cut-through state. The termination state is a state in which the optical path switching section sends a plurality of single wavelength signals to the relay section, and receives a single wavelength signal out of the plurality of single wavelength signals, or a single wavelength signal different from the plurality of single wavelength signals from the relay section. The cut-through state is a state in which the plurality of single wavelength signals are not relayed by the relay section. And in response to an optical path switching signal received from the control section, the optical path switching section switches an optical path to a destination node device, which is an adjacent node device, for each of a single wavelength signal of the plurality of single wavelength signals or a different single wavelength signal, and sends the single wavelength signal to the output section.

The output section multiplexes each of the single wavelength signals which have been sent from the optical path switching section to a common destination node device so as to generate an output wavelength multiplexed signal, and sends the output wavelength multiplexed signal to the common destination node device.

The relay section has a router and conversion devices. The conversion devices are installed one-to-one with two or more interfaces of the router. The conversion device converts the plurality of single wavelength signals received from the optical path switching section into electric signals, and sends them to the router, and converts the electric signals received from the router into single wavelength signals having mutually different wavelengths corresponding to a plurality of wavelengths of the input wavelength multiplexed signal respectively.

The control section has a storage section, packet receive means, node judgment means, destination node setting means, transmission possible wavelength acquisition means, transmission wavelength setting means, transmission possibility judgment means, reserve packet update means, reserve failure packet generation means, reserve completion packet generation means, packet transmission means and switching signal generation means.

In the storage section, a cost matrix, optical path state table and link state table are recorded. The optical path state table indicates the setting state of the optical path switching section and the switching state of the optical path.

The packet receive means receives a reserve packet from an adjacent node device or the management device, or receives a reserve failure packet from an adjacent node device, and stores it in the storage section.

The node judgment means judges whether the self node device is the start point node device, end point node device or relay node device in response to storing of the reserve packet.

The destination node setting means refers to the information on the cost matrix and the stored reserve packet, judges the start point node device, transit node device and transmission source node device of the reserve failure packet as transmission impossible node devices out of the adjacent node devices, and judges the rest as transmission possible node devices. The destination node setting means reads the transmission possible node device of which the transmission cost is lowest, and stores this transmission possible node device as a tentative destination node device.

If the self node device is the start point node device as a result of the node judgment by the node judgment means, the transmission possible wavelength acquisition means refers to the optical path state table, and acquires a transmission possible wavelength in response to the storing of the tentative destination node device. The transmission wavelength setting means temporarily sets one of the wavelengths not being used in an optical fiber connected to the tentative destination node device out of the transmission possible wavelengths acquired by referring to the link state table, as the transmission wavelength. If all of the transmission possible wavelengths are used for the optical fiber connected to the tentative destination node device, the transmission wavelength setting means updates the tentative destination node device stored in the storage section to a transmission impossible node device.

If the self node device is the relay node device as a result of the node judgment by the node judgment means, the transmission possibility judgment means refers to the link state table on an optical fiber connected to the tentative destination node device, and judges it as transmission possible if the transmission wavelength of the reserve packet is not in use, and as transmission impossible if the transmission wavelength of the reserve packet is in use. Responding to the judgment of transmission impossible, the transmission possibility judgment means updates the tentative destination node device stored in the storage section to a transmission impossible node device.

If the self node device is the start point node device, the reserve packet update means adds the information on the temporarily set transmission wavelength to the information on the transmission wavelength of the reserve packet stored in the storage section so as to update the reserve packet in response to the temporary setting of the transmission wavelength. If the self node device is the relay node device, the reserve packet update means adds the information on the temporarily set relay node device to the information on a transit node device of the reserve packet stored in the storage section so as to update the reserve packet in response to the judgment of transmission possible.

If the transmission possible node device does not exist in the judgment by the destination node setting means, the reserve failure packet generation means generates a new reserve failure packet which is different from the reserve failure packet stored in the storage section. If the self node device is the end point node device as a result of the node judgment by the node judgment means, the reserve completion packet generation means generates a reserve completion packet. If the updated reserve packet exists, the packet transmission means reads the updated reserve packet form the storage section, and sends it to the tentative destination node device. If the reserve completion packet is generated, the packet transmission means sends the reserve completion packet to the management device. If a new reserve failure packet is generated, the packet transmission means sends the new reserve failure packet to the transmission source of the stored reserve packet.

The switching signal generation means generates the terminal switching signal and the optical path switching signal in response to the reception of a path setting signal generated by the management device, and sends the termination switching signal and the optical path switching signal to the optical path switching section.

It is preferable that the control section of the node device further has established path judgment means and reserve packet addition means. The established path judgment means judges whether bidirectional optical paths are set between a start point node device and an end point node device if the self node device is an end point node device as a result of the node judgment by the node judgment means. The reserve packet addition means sets an end point node device and a start point node device included in a reserve packet stored in the storage section to a new start point node device and a new end point node device respectively, and adds the new start point node device and the new end point node device to the reserve packet if bidirectional optical paths are not set.

According to the third aspect of the present invention, there is provided an optical communication network comprising a plurality of node devices, optical fibers connecting adjacent node devices for transmitting wavelength multiplexed signals, and a management device connected to each of the plurality of node devices, wherein the above mentioned node device is used as the node device.

According to the fourth aspect of the present invention, there is provided an optical path reserve method executed in a relay node device when an optical path is set from a start point node device to an end point node device via the relay node device in an optical communication network which comprises a plurality of node devices including the start point node device, relay node device and the end point node device, optical fibers connecting adjacent node devices for transmitting wavelength multiplexed signals, and a management device connected to each of the plurality of node devices. This optical path reserve method has the following steps.

A reserve packet is received from an adjacent node device which is adjacent to the relay node device, and is stored in a storage section of the relay node device. Referring to a cost matrix which has been stored in the storage section of the relay node device in advance, the start node device and the transit node device, out of the adjacent node devices, are judged as transmission impossible node devices, and the rest are judged as transmission possible node devices, and a transmission possible node device of which the transmission cost is lowest is stored in the storage section as a tentative destination node device. Then referring to a link state table which has been stored in the storage section in advance, an optical fiber connected to the tentative destination node device is judged as transmission possible, if the transmission wavelength of the reserve packet is not in use. If the transmission wavelength of the reserve packet is in use in this optical fiber, the optical fiber is judged as transmission impossible, and the tentative destination node device stored in the storage section is updated to a transmission impossible node device. Responding to the judgment of transmission possible, information on the relay node device is added to the information on the transit node device of the reserve packet stored in the storage section, so as to update the reserve packet. If the updated reserve packet exists, the updated reserve packet is sent to the destination node device.

If a reserve failure packet is received from the tentative destination node device, the tentative destination node device is judged as a transmission impossible node device, and a step of temporarily setting the destination node device, a step of judging whether transmission is possible or not, a step of updating a reserve packet, and a step of sending the reserve packet, are further executed. If there is not a transmission possible node device, a new reserve failure packet, which is different from the received reserve failure packet, is generated, and the reserve failure packet is sent to the transmission source of the reserve packet which stored the reserve failed packet.

According to the fifth aspect of the present invention, there is provided an optical path reserve method, executed in a start point node device when an optical path is set from the start point node device to an end point node device via a relay node device in an optical communication network which comprises a plurality of node devices including the start point node device, relay node device and end point node device, optical fibers connecting adjacent node devices for transmitting wavelength multiplexed signals, and a management device connected to each of the plurality of node devices. This optical path reserve method has the following steps.

A reserve packet including information on the start point node device and the end point node device is received from the management device, and is stored in the storage section of the start point node device. Referring to an optical path state table which has been stored in the storage section in advance, a transmission possible wavelength is acquired. Referring to a cost matrix which has been stored in the storage section in advance, a transmission possible node device, of which transmission cost is lowest is temporarily set as a destination node device when the adjacent node device which is adjacent to the start point node device, is a transmission possible node device. Referring to a link state table which has been stored in the storage section in advance, one transmission possible wavelength, out of the wavelengths which are not used in an optical fiber connected with the tentative destination node device, is temporarily set as a transmission wavelength. Responding to the temporary setting of the transmission wavelength, information on the temporarily set transmission wavelength is added to the information on the transmission wavelength of the reserve packet stored in the storage section so as to update the reserve packet. If the updated reserve packet exists, the updated reserve packet is read from the storage section, and is sent to the tentative destination node device.

If a reserve failure packet is received from the tentative destination node device, the tentative destination node device is judged as a transmission impossible node device, and a step of temporarily setting the destination node device, a step of temporarily setting the transmission wavelength, a step of updating the reserve packet and a step of sending the reserve packet, are further executed. If there is not a transmission possible wavelength, or if there is not a transmission possible node device, a new reserve failure packet, which is different from the received reserve failure packet, is generated, and the new reserve failure packet is sent to the management device.

According to the sixth aspect of the present invention, there is provided an optical path reserve method, executed in an end point node device when an optical path is set from a start point node device to the end point node device via a relay node device in an optical communication network which comprises a plurality of node devices including the start point node device, relay node device and end point node device, optical fibers connecting adjacent node devices for transmitting wavelength multiplex signals, and a management device connected to each of the plurality of node devices. This optical path reserve method has the following steps.

A reserve packet is received from an adjacent node device which is adjacent to the end point node device, and is stored in a storage section of the end point node device. Then it is judged whether bidirectional optical paths are reserved between the start point node device and the end point node device.

If bidirectional optical paths are reserved, a reserve completion packet is generated and the reserve completion packet is sent to the management device, and if bidirectional optical paths are not reserved, an end point node device and a start point node device included in the reserve packet are set to a new start point node device and a new end point node device respectively, and are added to the reserve packet. Then processing similar to the above mentioned optical path reserve method executed in the start point node device is executed.

According to the seventh aspect of the present invention, there is provided a computer readable recording medium comprising software which executes the above mentioned optical path reserve method.

According to an optical path setting device for setting an optical path in an optical communication network, in an optical communication network comprising an optical path setting device, an optical path reserve method, and program thereof, the distributed control method is used, and in a node device which received a reserve packet, a node device of which communication cost is lowest, out of the node devices adjacent to this node device, is temporarily set to a destination node device, and the reserve packet is sent to this tentative destination node device. In this case, an increase in processing time due to an expansion of the network scale can be suppressed by using the distributed control method, and the probability of the occurrence of blocking can be decreased since path selection and wavelength reservation are performed simultaneously. As a result, the number of trial times due to wavelength reserve failure can be decreased, so the time required for path setting can be decreased.

According to the eighth aspect of the present invention, there is provided a node device in an optical communication network which comprises a plurality of node devices including a start point node device, relay node device and end point node device, optical fibers connecting adjacent node devices for transmitting wavelength multiplexed signals, and a management device connected to each of the plurality of node devices for generating reserve packets, and in which an optical path is set from the start point node device to the end point node device via the relay node device. This node device comprises an input section, optical path switching section, output section and control section.

When this node device is referred to as a self node device, the input section demultiplexes input wavelength multiplexed signals which are input from an adjacent node device, which is adjacent to the self node device, into each wavelength so as to generate a plurality of single wavelength signals, and sends each of the single wavelength signals to the optical path switching section. Responding to an optical path switching signal received from the control section, the optical path switching section switches an optical path to an adjacent destination node device for each of the single wavelength signals, and sends each of single wavelength signals to the output section. The output section multiplexes each of the single wavelength signals which have been sent from the optical path switching section to a common destination node device so as to generate an output wavelength multiplexed signal, and sends the output wavelength multiplexed signal to the common destination node device.

The control section has a storage section, packet receive means, destination node setting means, transmission wavelength change means, reserve packet update means, reserve failure packet generation means, packet transmission means, transmission count storage means, reserve failure judgment means and switching signal generation means. In the storage section, a cost matrix and a link state table are recorded. The packet receive means receives a reserve packet or a reserve failure packet from the adjacent node device, and stores it in the storage section. The destination node setting means refers to the information on the cost matrix and the stored reserve packet, judges the start point node device and transit node device out of the adjacent node devices as transmission impossible node devices, and judges the rest as transmission possible node devices. The destination node setting means stores one or two or more transmission possible node devices in the storage section as tentative destination node devices. The transmission wavelength change means refers to the link state table, and removes the wavelengths in use in the optical fiber connected to each of the tentative destination node devices from the transmission wavelengths of the reserve packet so as to change the transmission wavelength of the reserve packet. If all the transmission wavelengths of the reserve packet are in use, the transmission wavelength change means judges it as transmission impossible. The reserve packet update means adds information on this relay node device to the information on a transit node device of the reserve packet stored in the storage section responding to the change of the transmission wavelength, so as to update the reserve packet. The reserve failure packet generation means generates a reserve failure packet if a transmission possible node device does not exist in the judgment by the destination node setting means, or if the transmission wavelengths are used in optical fibers connected to all the tentative destination node devices. If an updated reserve packet exists, the packet transmission means reads the updated reserve packet from the storage section, and sends it to the tentative destination node device. If a new reserve failure packet is generated, the packet transmission means sends a new reserve failure packet to the reserve packet transmission source. The transmission count storage means readably stores the transmission count of the updated reserve packet in the storage section. The reserve failure judgment means compares the receive count of the reserve failure packets with the transmission count read from the storage section, and judges that there is not a transmission possible node device if the receive count is the same as the transmission count. The switching signal generation means generates an optical path switching signal responding to the reception of the path setting signal generated by the management device, and sends the optical path switching signal to the optical path switching section.

According to the ninth aspect of the present invention, there is provided a node device in an optical communications network which comprises a plurality of node devices including a start point node device, relay node device and end point node device, optical fibers connecting adjacent node devices for transmitting wavelength multiplexed signals, and a management device connected to each of the plurality of node devices for generating reserve packets, and in which an optical path is set from the start point node device to the end point node device via the relay node device. This node device comprises an input section, optical path switching section, output section, relay section and control section.

When this node device is referred to as a self node device, the input section demultiplexes input wavelength multiplexed signals which are input from an adjacent node device, which is adjacent to the self node device, into each wavelength so as to generate a plurality of single wavelength signals, and sends each of the single wavelength signals to the optical path switching section. The optical path switching section switches to one of the 2 setting states, that are the termination state and the cut-through state. Responding to an optical path switching signal received from the control section, the optical path switching section switches an optical path of a single wavelength signal of a plurality of single wavelength signals, another single wavelength signal, or a plurality of single wavelength signals, to a destination node device which is the adjacent node device for each of the single wavelength signals, and sends the single wavelength signal to the output section.

The output section multiplexes each of the single wavelength signals which have been sent from the optical path switching section to a common destination node device, and generates an output wavelength multiplexed signal, and sends the output wavelength multiplexed signal to the common destination node device.

The relay section has a router and conversion devices. The conversion devices are installed one-to-one with two or more interfaces of the router. A conversion device converts the plurality of single wavelength signals received from the optical path switching section into electric signals, sends them to the router, and converts the electric signals received from the router into single wavelength signals having mutually different wavelengths corresponding to a plurality of wavelengths of the input wavelength multiplexed signal respectively.

The control section has a storage section, packet receive means, node judgment means, destination node setting means, transmission possible wavelength acquisition means, transmission wavelength setting means, transmission wavelength change means, reserve packet update means, reserve failure packet generation means, reserve completion packet generation means, packet transmission means, transmission count storage means, reserve failure judgment means, and switching signal generation means.

In the storage section, a cost matrix, an optical path state table and a link state table are stored. The packet receive means receives a reserve packet from the adjacent node device or the management device, or receives a reserve failure packet from the adjacent node device, and stores it in the storage section. The node judgment means judges whether the self node device is the start point node device, end point node device or relay node device, responding to storing the reserve packet. The destination node setting means refers to the cost matrix and reserve packet stored in the storage section, judges the start point node device and the transit node device out of the adjacent node devices as transmission impossible node devices, and judges the rest as transmission possible node devices. The destination node setting means stores one or two or more transmission possible node devices in the storage section as tentative destination node device.

If the self node device is the start point node device as a result of node judgment by the node judgment means, the transmission possible wavelength acquisition means refers to the optical path state table and acquires a transmission possible wavelength, responding to storing of the tentative destination nodes. If the self node device is the start point node device, the transmission wavelength setting means refers to the link state table and temporarily sets one or two or more wavelengths not being used in an optical fiber connected to the tentative destination node device out of the transmission possible wavelengths. If all of the transmission possible wavelengths are used for the optical fiber connected to the tentative destination node device, the transmission wavelength setting means updates the tentative destination node device stored in the storage section to a transmission impossible node device.

If the self node device is the relay node device, the transmission wavelength change means refers to the link state table, and removes the wavelengths in use in the optical fiber connected to the tentative destination node device from the transmission wavelengths of the reserve packet so as to change the transmission wavelength. The transmission wavelength change means judges that transmission is impossible to a tentative destination node device of which all the transmission wavelengths of the reserve packet are in use, and updates the tentative destination node device to a transmission impossible node device.

If the self node device is the start point node device, the reserve packet update means updates the reserve packet stored in the storage section responding to the change of the transmission wavelength. If the self node device is the relay node device, the reserve packet update means updates the reserve packet stored in the storage section responding to the change of the transmission wavelength. If the transmission possible node device does not exist in the judgment by the destination node setting means, or if the transmission wavelength is used in an optical fiber connected to all the transmission possible node devices, the reserve failure packet generation means generates a reserve failure packet. If the self node device is the end point node device, the reserve completion packet generation means generates a reserve completion packet.

If the updated reserve packet exists, the packet transmission means reads the updated reserve packet from the storage section, and sends it to the tentative destination node device. If the reserve completion packet is generated, the packet transmission means sends the reserve completion packet to the management device. If the reserve failure packet is generated, the packet transmission means sends the reserve failure packet to the reserve packet transmission source.

The transmission count storage means readably stores the transmission count of the updated reserve packet in the storage section. The reserve failure judgment means compares the receive count of the reserve failure packets with the transmission count read from the storage section, and judges that there is not a transmission possible node device if the receive count of the reserve failure packets is the same as the transmission count of the updated reserve packets. The switching signal generation means generates the terminal switching signal and the optical path switching signal responding to the reception of a path setting signal generated by the management device, and sends the termination switching signal and the optical path switching signal to the optical path switching section.

According to the tenth aspect of the present invention, there is provided an optical path reserve method executed in a relay node device when an optical path is set from a start point node device to an end point node device via the relay node device in an optical communication network which comprises a plurality of node devices including the start point node device, relay node device and end point node device, optical fibers connecting adjacent node devices for transmitting wavelength multiplexed signals, and a management device connected to each of the plurality of node devices. This optical path reserve method has the following steps.

A reserve packet is received from an adjacent node device which is adjacent to the relay node device, and is stored in the storage section of the relay node device. Referring to a cost matrix which has been stored in the storage section in advance, the start point node device and transit node device, out of the node devices adjacent to the relay node devices, are judged as transmission impossible node devices, and the rest are judged as transmission possible node device, and one or two or more transmission possible node devices are stored in the storage section as tentative destination node devices. Then referring to a link state table which has been stored in the storage section in advance, wavelengths being used in the optical fibers connected with the tentative destination node device are removed so as to change the transmission wavelength. Information on the relay node device is added to the information on the transit node device of the reserve packet stored in the storage section, so as to update the reserve packet responding to the change of the transmission wavelength. If the updated reserve packet exists, the updated reserve packet is read from the storage section, and is sent to one or two or more tentative destination node devices. The transmission count of the updated reserve packet is readably stored in the storage section. If a reserve failure packet is received from the tentative destination node device, the receive count of the reserve failure packet and the transmission count of the updated reserve packet are compared, and it is judged that a transmission possible node device does not exist if there is a match.

If there is not a transmission possible node device, of if there is not a transmission wavelength, a new reserve failure packet, which is different from the received reserve failure packet, is generated, and the new reserve failure packet is sent to the reserve packet transmission source.

According to the eleventh aspect of the present invention, there is provided an optical path reserve method executed in a start point node device when an optical path is set from the start point node device to an end point node device via a relay node device in an optical communication network which comprises a plurality of node devices including the start point node device, relay node device and end point node device, optical fibers connecting adjacent node devices for transmitting wavelength multiplexed signals, and a management device connected to each of the plurality of node devices. This optical path reserve method has the following steps.

A reserve packet is received from the management device, and is stored in the storage section of the start point node device. Then referring to an optical path state table which has been stored in the storage section in advance, a transmission possible wavelength is acquired. Then referring to a cost matrix which has been stored in the storage section in advance, one or two or more transmission possible node devices, which are adjacent node devices, adjacent to the start point node device, are temporarily set as destination node devices. Referring to a link state table which has been stored in the storage section in advance, one or two or more wavelengths, which are transmission possible wavelengths, and are not used in an optical fiber connected with the tentative destination node devices, are temporarily set as transmission wavelengths. Information on the temporarily set transmission wavelength is added to the information on the transmission wavelength of the reserve packet stored in the storage section so as to update the reserve packet responding to the temporary setting of the transmission wavelength. If the updated reserve packet exists, the updated reserve packet is read from the storage section, and is sent to one or two or more tentative destination node devices. A transmission count of the updated reserve packet is stored in the storage section. If a reserve failure packet is received from the tentative destination node device, a receive count of the reserve failure packet and the transmission count are compared, and it is judged that a transmission possible node device does not exist if those counts are equal.

If there is not a transmission possible node device or if there is not a transmission wavelength, a new reserve failure packet, which is different from the received reserve failure packet, is generated, and the new reserve failure packet is sent to the management device.

According to the twelfth aspect of the present invention, there is provided an optical path reserve method executed in an end point node device when an optical path is set from a start point node device to the end point node device via a relay node device in an optical communication network which comprises a plurality of node devices including the start point node device, relay node device and end point node device, optical fibers connecting adjacent node devices for transmitting wavelength multiplexed signals, and a management device connected to each of the plurality of node devices. This optical path reserve method has the following steps.

A reserve packet is received from the adjacent node device which is adjacent to the end point node device, and is stored in the storage section of the end point node device. Then it is judged whether bidirectional optical paths are set between the start point node device and the end point node device.

If bidirectional optical paths are reserved, a reserve completion packet is generated, and the reserve completion packet is sent to the management device. If bidirectional optical paths are not reserved, an end point node device and start point node device included in the reserve packet are set to a new start point node device and a new end point node device, and are added to the reserve packet. Then a processing similar to the above mentioned start point node device is executed.

As described above, if the node device which received the reserve packet sends the reserve packets to all the adjacent node devices simultaneously, wavelength reserve processing can be performed in parallel, so time required for path setting can be further decreased.

BRIEF DESCRIPTION OF THE DRAWINGS

The foregoing and other objects, features and advantages of the present invention will be better understood from the following description taken in connection with the accompanying drawings, in which:

FIG. 4B is a block diagram depicting a configuration example of the function means implemented by a CPU according to the first embodiment of the present invention;

FIG. 7A shows the processing flow in the start point node device.

FIG. 9A to 9I show the link state tables stored in each node device (N1 to N9) respectively;

FIG. 12A shows the processing flow in the start point node device.

DESCRIPTION OF THE PREFERRED EMBODIMENTS

Embodiments of the present invention will now be described with reference to the drawings. Preferred configuration examples of the present invention will be described below, but numerical conditions of each composing element are merely preferable examples. Therefore the present invention shall not be limited by the following embodiments.

Configuration of First Embodiment

Figure 1:
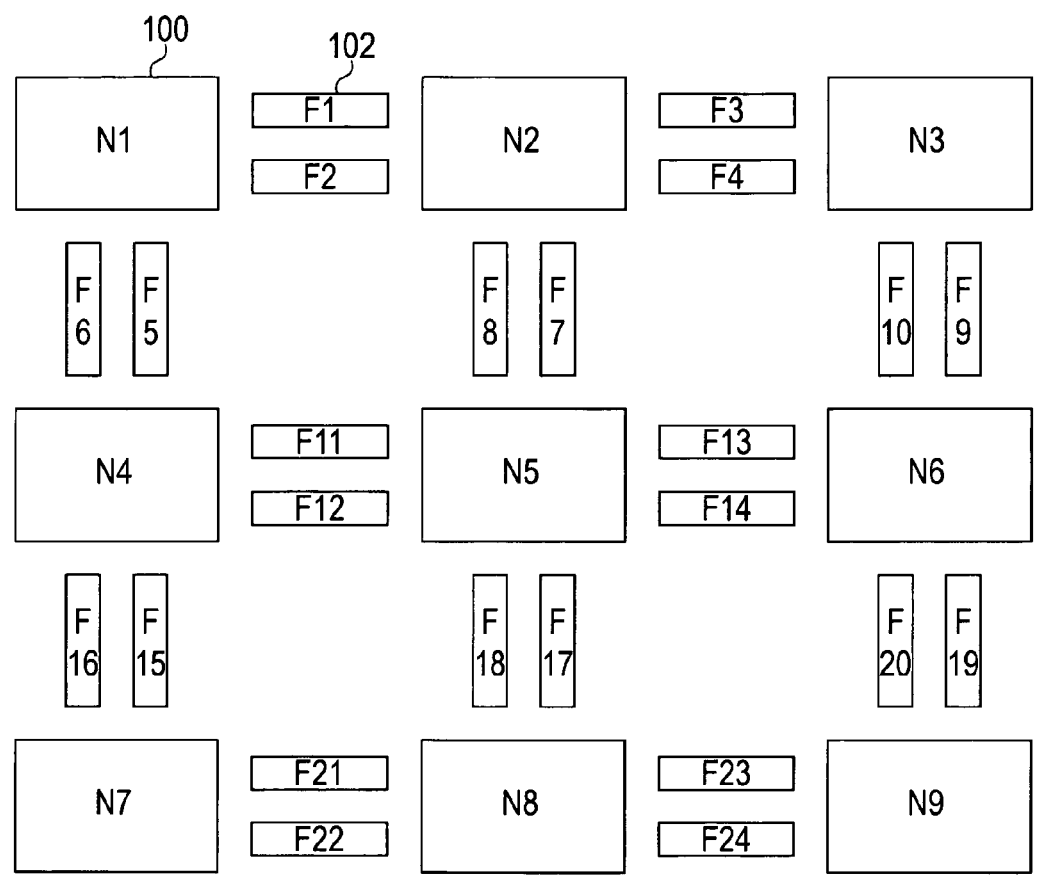
FIG. 1 is a block diagram depicting the optical communication network of the present invention.

A configuration example of an optical communication network using WDM, to which the present invention is applied, will be described with reference to FIG. 1. The optical communication network is comprised of a plurality of node devices (may be denoted by N herein below) 100, which are arranged in a lattice, for example, and optical fibers 102 connecting adjacent node devices 100 for transmitting wavelength multiplexed signals. In this optical communication network, an optical path is set from a start point node device, which is one of the plurality of node devices 100 to an end point node device, which is another node device. If the optical path to be set passes through a node device 100 other than the start point node device and end point node device, the node device 100 through which the optical path passes is called a "relay node device".

In this description, it is assumed that 9 node devices 100 are laid out in a 3×3 lattice. To these node devices 100, a unique identifier (ID) is assigned respectively. It is assumed that a natural number from 1 to 9 is used as a node ID, assigned to each node device respectively. For example, N1 indicates a node device of which the node ID is 1.

Adjacent node devices 100 are physically connected by the optical fiber 102. In this configuration example, two optical fibers 102 installed in parallel connect between the node devices 100, and each optical fiber transmits wavelength multiplexed signals in one direction, which is different from each other. To these optical fibers 102, a unique fiber ID is assigned respectively. It is assumed that a natural number from 1 to 24 is used as a fiber ID assigned to each of these optical fibers. Here an optical fiber is denoted with F, and F1, for example, indicates an optical fiber of which the fiber ID is 1. For the optical fiber 102, a conventionally known optical fiber for communication can be used according to the settings, such as the wavelength to be used.

The configuration of the optical communication network, such as the number of node device, layout and connection relationship among the node device is not limited to this example.

Figure 2:
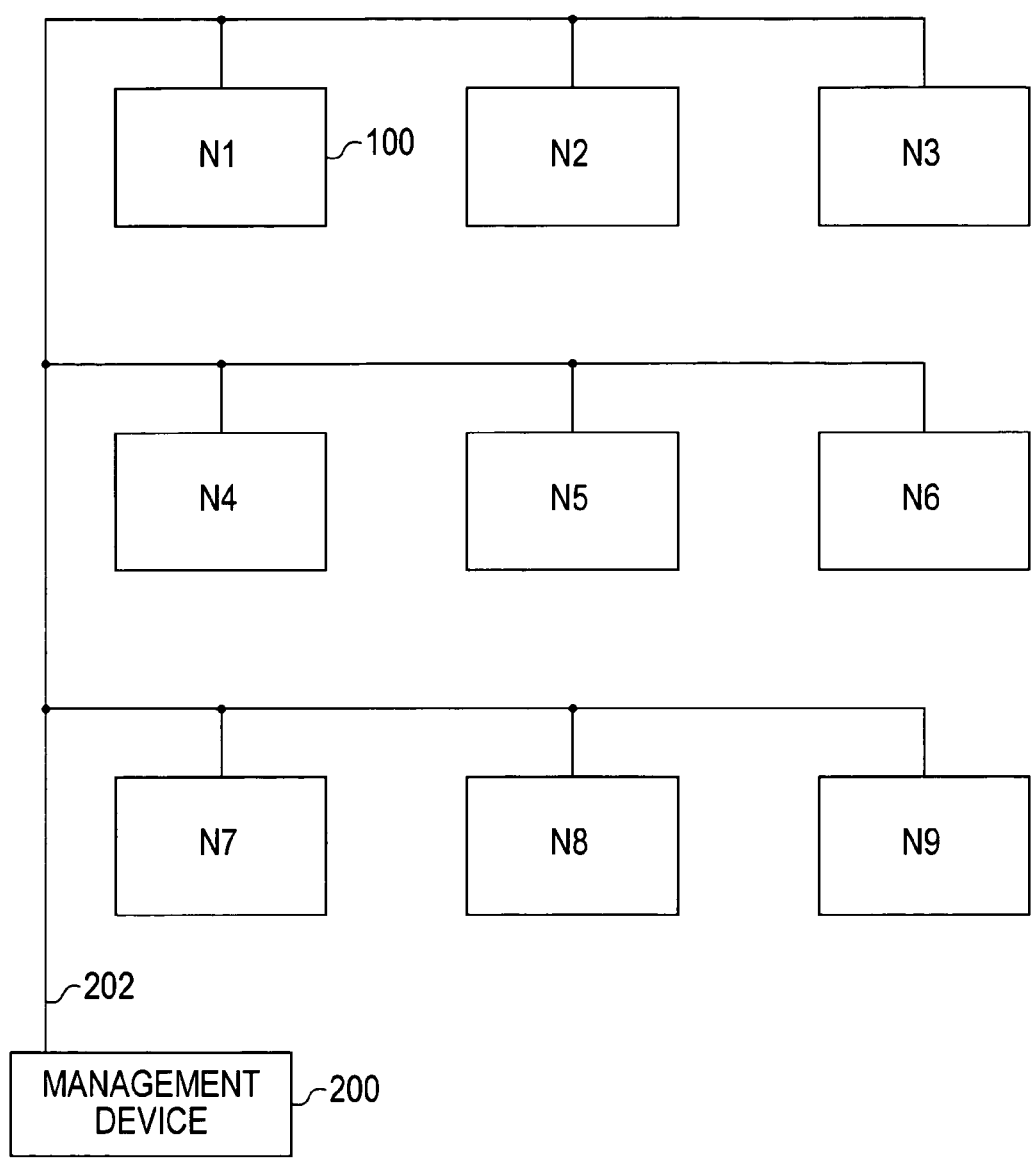
FIG. 2 is a block diagram depicting the control network of the present invention.

Now the control network will be described with reference to FIG. 2. The control network is comprised of the node devices (N1 to N9) 100, management device 200, and control line 202, and is used for performing control, such as the setting of paths of the optical communication network. Hereafter a path to be set may also be called an "optical path". The control line 202 transfer control signals which are transmitted and received between the management device 200 and each node device (N1 to N9) 100. FIG. 2 shows an example when the control network is installed separately from the optical communication network, but the management device may be installed inside the optical communication network so that the control signals are transferred by the optical communication network.

The management device 200 is a known computer comprising an MPU (Micro Processing Unit), storage section, transmission section, receive section, input means and output means, for example. The MPU can have a known configuration, and here the MPU comprises a CPU and RAM and ROM as memories. The storage section may be installed as a storage device, such as a hard disk, or may be installed inside RAM. The input means has a known input device normally used for computers, such as a keyboard and a mouse. The output means has an output device normally used for computers, such as a display and a printer.

When a new optical path is set in an optical communication network, an administrator operates the input means of the management device 200, inputs the node IDs of the start point node device and the end point node device of the optical path as the optical path reserve information, and stores them in the storage section of the management device 200. The control means of the CPU executes the program recorded in ROM, etc. responding to the input of the optical path reserve information so as to generate a reserve packet as a control signal. The reserve packet includes such information as a packet ID for indicating this is the reserve packet, start point node device, end point node device, transmission wavelength, transit node device and reserve possibility judgment flag. Here it is assumed that the reserve possibility judgment flag is the number of the node devices through which the optical path passes. Hereafter the number of node devices through which the optical path passes, that is relay nodes, may also be called the "physical hop count". The reserve possibility judgment flag may be set based on the physical transmission distance. The optical path reserve information to be input from the input means is only the node IDs of the start point node device and end point node device, and at the point of generating the reserve packet, the wavelength to be used and the transit node devices have not yet been determined. Therefore the IDs which are not used for this optical communication network are written in advance as information on the transmission wavelength and transit node devices of the reserve packet. Here "0" is written both for the transmission wavelength ID and the transit node ID. The reserve possibility judgment flag is also set to "0". The generated reserve packet is sent to the start point node device.

The management device 200 receives information on whether the reserve of the optical path from the start point node device succeeded or failed using the receive section thereof, and outputs the result through the output means to notify the administrator. If the reserve of the optical path succeeded, the management device 200 records the information on the optical path in an internal RAM or storage device, and generates the optical path setting signal for setting an optical path, and sends it to the start point node device, end point node device and relay node device. The termination state and optical path state are switched in each node device responding to the optical path setting signal.

After generating the termination switching signal and the optical path switching signal responding to the reception of this optical path setting signal, the control section of each node device sends the terminal switching signal and optical path switching signal to the optical path switching section. At this time, a table for indicting the IP path setting status, of the router of the node device, is updated.

In the configuration of this description, the reserve packet is generated responding to the input of the start point node device and end point node device from the administrator, but an optimum path search function may be provided in the management device 200, so that the reserve packet is generated responding to the result of the optimum path search.

Figure 3:
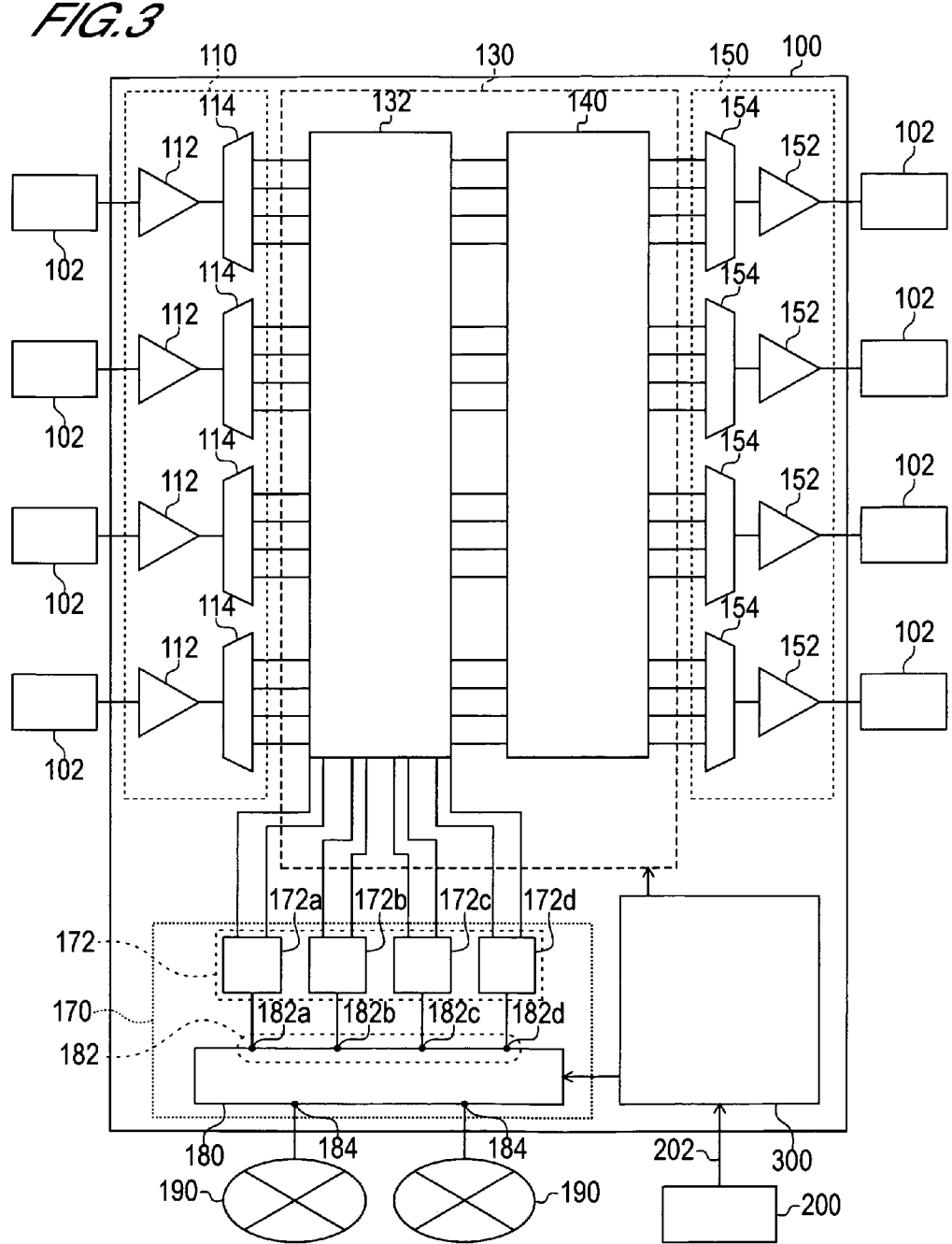
FIG. 3 is a block diagram depicting a configuration example of the node device of the present invention.

Each node device mentioned above has an identical configuration, so one node device will be described below. A configuration example of the node device of this invention will now be described with reference to FIG. 3.

The node device 100 is comprised of an input section 110, optical path switching section 130, output section 150, relay section 170 and control section 300. In this configuration, 4 node devices are adjacent to the node device 100, and the node devices adjacent to each other are connected via the optical fiber 102 respectively. In this configuration example, 4 optical fibers 102 are connected to the input side and the output side of the node device 100 respectively. To the node device 100, an input wavelength multiplexed signal is sent from the 4 adjacent node devices 100. The node device 100 outputs an output wavelength multiplexed signal, which is the same as or different from the input wavelength multiplexed signal, to the 4 adjacent node devices. Here it is assumed that an adjacent node device which sends the input wavelength multiplexed signal is called an "input side node device", and an adjacent node device which receives the output wavelength multiplexed signal is called an "output side node device".

To the input section 110, a wavelength multiplexed signal is input from the input side node device as the input wavelength multiplexed signal via the optical fiber 102. Here it is assumed that the wavelength multiplexed signal is 4 optical signals of which wavelengths of the carrier are different from each other (hereafter called single wavelength signals) which are multiplexed. To these 4 wavelengths, a unique wavelength ID is assigned respectively. A natural number from 1 to 4 is used for the wavelength ID assigned to each wavelength. Here the wavelength is extended by $\lambda$, and $\lambda 1$, for example, indicates a wavelength of which the wavelength ID is 1.

From the output section 150 of the node device 100, a wavelength multiplexed signal is output to the output side node device as the output wavelength multiplexed signal via the optical fiber 102.

In this description, the number of adjacent node devices is 4, but the number of adjacent node devices may be more or less than this depending on the configuration of the optical communication network and the position of the node device in the optical communication network. The number of wavelengths to be multiplexed is not limited to 4 either.

The input section 110 comprises a plurality of sets of an optical amplifier 112 and a demultiplexer 114. The number of sets is the same as the number of optical fibers 102 connected to the input section 110. In this configuration example, the number of optical fibers 102 connected to the input section 110 is 4, so the input section 110 has 4 optical amplifiers 112 and 4 demultiplexers 114. The input wavelength multiplexed signal which is input from each transmission source node device via the corresponding optical fiber 102 respectively is amplified by the optical amplifier 112, then is demultiplexed into 4 single wavelength signals for each wavelength $\lambda 1$ to $\lambda 4$ by the demultiplexer 114 respectively. Then the single wavelength signal is sent to the later mentioned optical path switching section 130. To the input section 110, 4 optical fibers 102 are connected, and 4 series of input wavelength multiplexed signals are demultiplexed into 4 single wavelength signals respectively. Therefore 16 series of single wavelength signals are sent to the optical path switching section 130. For this optical amplifier 112, it is preferable to use EDFA (Erbium-Doped Fiber Amplifier). For this demultiplexer 114, it is preferable to use AWG (Arrayed—Wave Guide Grating) for example.

The output section 150 comprises a plurality of sets of a multiplexer 154 and an optical amplifier 152. The number of sets is the same as the number of optical fibers 102 connected to the output section 150. In this configuration example, 4 optical fibers 102 are connected to the output section 150, so the output section 150 has 4 multiplexers 154 and 4 optical amplifiers 152. The single wavelength signal which is sent from the optical path switching section 130 is multiplexed, or is wavelength multiplexed, by the multiplexer 154 for each destination node device. The wavelength multiplexed signal acquired by wavelength multiplexing is amplified by the optical amplifier 152, is then output as the output wavelength multiplexed signal, and is sent to the destination node device via the optical fiber 102. For this optical amplifier 152, it is preferable to use EDFA (Erbium-Doped Fiber Amplifier), for example. For this multiplexer 154, it is preferable to use AWG (Arrayed-Wave Guide Grating), for example.

The optical path switching section 130 comprises a termination section 132 and an optical switch section 140.

The termination section 132 has a means of implementing the function to switch the setting state between cut-through state and termination state for each of the 16 series of single wavelength signals sent from the input section 110. This setting state is switched responding to the reception of the optical path setting signal from the management device 200 by the control section 300. In this case, the cut-through state is a state of the termination section 132 sending the single wavelength signal received from the demultiplexer 114 directly to the optical switch section 140 without passing through the relay section 170. The termination state is a state of the termination section 132 relaying the single wavelength signal received from the demultiplexer 114 using the relay section 170. In the termination state, the optical path switching section 130 sends the single wavelength signal, which the termination section 132 received from the demultiplexer 114, to the relay section 170, and receives the single wavelength signal which the termination section sent to the relay section 170, or another single wavelength signal from the relay section 170.

To implement the above function to switch the setting state, the termination section 132 has a known arbitrary OADM (Optical Add Drop Multiplexing) device or an OXC (Optical Cross-Connect) device, for example, for each of the optical paths where the 16 series of single wavelength signals pass through. In this configuration example, the termination section 132 has 16 OADM devices (not illustrated). Responding to the termination switching signal from the control section 300, each OADM device switches the setting state to either termination state or cut-through state. The termination section 132 sends 16 series of signal wavelength signals, for the same number as the number of single wavelength signals sent from the input section 110, to the optical switch section 140.

The single wavelength signals which were input to the optical switch section 140 are switched by the optical switch section 140, and then is wavelength multiplexed by the output section 150. The wavelength multiplexed signal generated by the wavelength multiplexing is sent to another adjacent node device of the destination via one of the 4 optical fibers 102 connected to the output section 150. An optical path of the single wavelength signal is switched for each of the 16 series of single wavelength signals. Therefore it is preferable that the optical switch section 140 comprises 16 1×4 optical switches, for example. For the 1×4 optical switch in this case, a known arbitrary one, which has one input terminal and 4 output terminals and outputs one of the single wavelength signals which were input through an output terminal can be used. Each of the output terminals of each 1×4 optical switch device is connected to the first to fourth multiplexer 154. Responding to the optical path switching signal supplied from the management device 200 via the control section 300, each 1×4 optical switch switches an optical path of the optical signal sent from the termination section 132 to the destination node device, and outputs it to one of the first to fourth multiplexers 154.

The relay section 170 comprises a router 180 and conversion devices 172 (172a, 172b, 172c and 172d). The first to fourth conversion devices 172a to 172d converts electronic signals into optical signals, and vice versa. Each of the conversion devices 172 correspond to the 4 output terminals of each demultiplexer 114 one-to-one. In the same way, the output terminal of the conversion device 172 corresponds to the output terminal of each demultiplexer 114 one-to-one. Each conversion device 172 converts the optical signal sent from the demultiplexer 114 via the termination section 132 into an electric signal, and sends it to the router 180.

The router 180 comprises internal interfaces 182 (182a, 182b, 182c and 182d) and external interface 184 as the interfaces. The same number of internal interfaces 182 as the number of wavelengths multiplexed by the wavelength multiplexed signal are installed. In this example, a wavelength multiplexed signal, in which 4 wavelengths are multiplexed, propagates the optical communication network, so the router 180 has 4 internal interfaces, that are the first to fourth internal interfaces 182a to 182d and external interface 184.

The router 180 outputs the electric signal which is received from each conversion device 172, or input from the external interface 184 to either the first to fourth internal interface 182a to 182d, or external interface 184 with specifying the path information. The electric signal output from the external interface 184 is sent to the external network 190.

The first to fourth conversion devices 172a to 172d are installed corresponding to the first to fourth internal interfaces 182a to 182d one-to-one. The single wavelength signal which was converted from an electronic signal by the first to fourth conversion devices 172a to 172d is sent to the optical path switching section 130.

The first to fourth conversion device 172a to 172d use different wavelengths respectively to convert electric signals into single wavelength signals. The first conversion device 172a converts an electric signal, which is output from the first internal interface 182a, into a single wavelength signal of which wavelength is λ1. The second conversion device 172b converts an electric signal which is output from the second internal interface 182b into a single wavelength signal of which wavelength is λ2. The third conversion device 172c converts an electric signal which is output from the third internal interface 182c into a single wavelength signal of which wavelength is λ3. The fourth conversion device 172d converts an electric signal which is output from the fourth internal interface 182d into a single wavelength signal of which wavelength is λ4.

For the router 180, a known arbitrary router comprising a plurality of interfaces can be used. Out of the plurality of interfaces of the router 180, a part is used as the first to fourth internal interfaces 182a to 182d, and the rest is used as the external interface 184. As mentioned above, the first to fourth conversion devices 172a to 172d has an electric/optical conversion function and optical/electric conversion function. These functions are used for an ordinary optical fiber communication system. Therefore the first to fourth conversion devices 172a to 172d can be implemented using a known arbitrary technology.

Figure 4A:
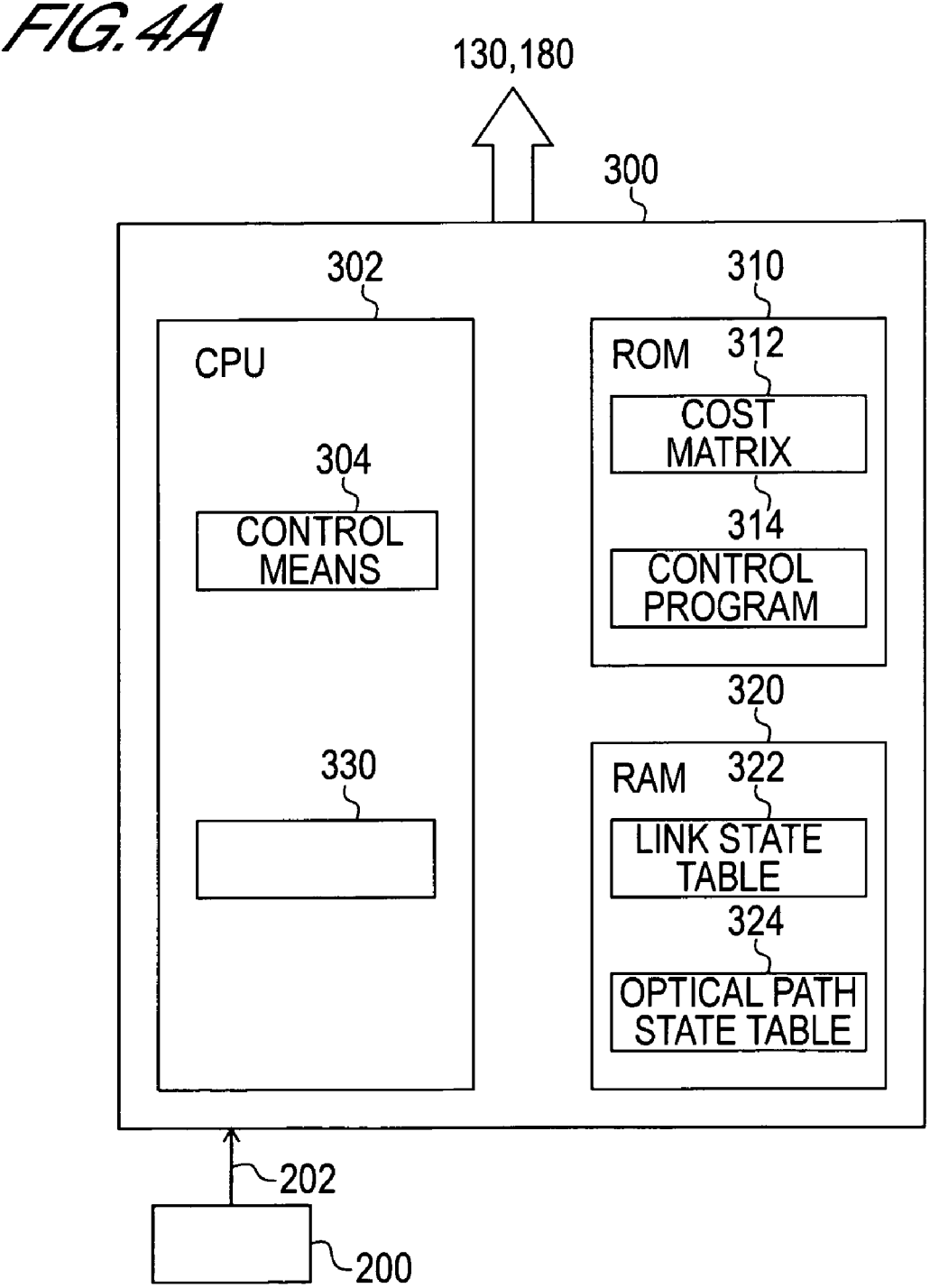
FIG. 4A is a block diagram depicting a configuration example of the control section according to the first embodiment of the present invention.

Now a configuration example of the control section of the node device according to the present invention will be described with reference to FIG. 4A and 4B.

The control section 300 is comprised of a CPU (Central Processing unit) 302, and a storage section such as RAM (Random Access Memory) 320 and ROM (Read Only Memory) 310 as memories. The control means 304 of the CPU 302 reads the control program 314 which is readably recorded in the ROM 320, and executes the control program 314, so as to implement each function means 330, that is the packet receive means 332, packet transmission means 334, reserve packet addition means 336, reserve packet update means 338, node judgment means 340, established path judgment means 342, reserve possibility judgment means 344, transmission possible wavelength acquisition means 346, destination node setting means 348, transmission wavelength setting means 350, transmission possibility judgment means 352, switching signal generation means 354, optical path state acquisition means 356, link state update means 358, link state acquisition means 360 and reserve failure packet generation means 362. Processing of each function means 330 will be described in detail later.

Figures 5, 6:
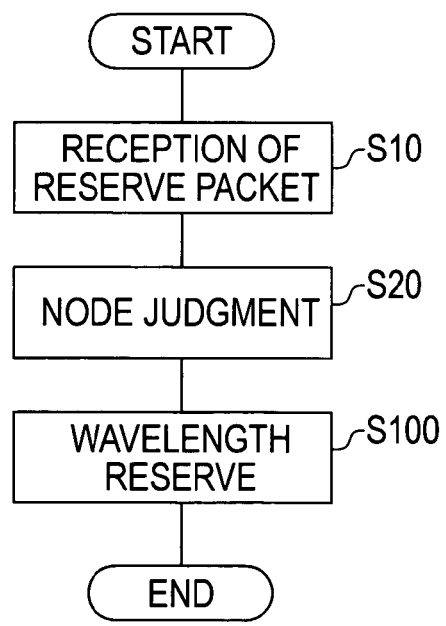
FIG. 5 shows an example of the cost matrix between node devices.
FIG. 6 is a flow chart depicting the processing flow in the node device of the present invention.

A cost matrix 312 has been readably stored in ROM 310. The cost matrix 312 will be described with reference to FIG. 5. The cost matrix 312 shown in FIG. 5 shows the cost between adjacent node devices in a matrix using numerics which indicate the physical distance between the transmission source node device and destination node device. In this example, the cost between node devices which are not adjacent to each other is "0", and for the adjacent node devices, the cost is shown by a numeric of 1 to 5 sequentially as the distance becomes longer. The cost matrix 312 is written in the ROM 310 of each node device 100 before the optical communication network is operated. The cost matrix 312 may be readably and rewritably written in the RAM 320. If the cost matrix 312 is written to the RAM 320, the management device 200 sends the cost matrix to each node device when the optical communication network is operating, so that the cost matrix can be rewritten in each node. The cost may be determined by an available number of wavelengths, for example, not necessarily by the physical distance. For example, if there is not available wavelength between the transmission node device and the receive node device, the above numeric is "0", and the numeric to be assigned increases as the number of available wavelengths increases. The numerics to indicate the transmission cost are just examples, and a numeric greater than 5 may be used, or a number other than an integer, such as a decimal, may be used.

In the RAM 320, a link state table 322 and an optical path state table 324 have been readably and rewritably stored.

The link state table 322 indicates a node ID of an adjacent node device which is adjacent to the self node device, a fiber ID of an optical fiber between the self node device and each adjacent node device, and whether transmission is active in the optical fiber or not, and a wavelength component included in the wavelength multiplexed signal when the transmission is being performed, that is a wavelength ID of the wavelength being used for transmission. The link state table will be described in detail later.

The optical path state table 324 indicates information on the state which has been set for the optical path switching section thus far, such as whether each OADM device of the termination section 132 is in cut-through state or termination state, or via which multiplexer 154 each 1×4 optical switch device of the optical switch section 140 is outputting the signal wavelength signal. This setting state of the OADM device is updated by the generation of the above mentioned termination switching signal. The setting status of the optical switch section is updated by the optical path switching signal.

The node device which is used only for the relay node device requires only switching of the destination node device, so it is not required to comprise the relay section and termination section.

Operation of First Embodiment

Now the optical path reserve method for setting a new optical path in the optical communication network where a plurality of optical paths are set will be described with reference to FIG. 6 and FIG. 7A to C.

In the reserve packet receive step in step (hereafter "S") 10, a self node device receives a reserve packet from an adjacent node device or a management device. In this step, the packet receive means 332 receives the packet via the control line 202. Responding to the reception of the packet, the packet receive means 332 reads the reserve packet ID which has been written as the ID to indicate the reserve packet in the ROM 312, for example, and collates the packet ID assigned to the received packet and the reserve packet ID. If the packet ID of the received packet matches the reserve packet ID, the received packet is judged as a reserve packet. If the received packet is a reserve packet, this reserve packet is readably written to the open space of the RAM 320, then the processing in S20 is executed.

In the node judgment step in S20, responding to the judgment that the received packet is a reserve packet in S10, the node judgment means 340 judges whether the self node device is a start point node device or an end point node device of the optical path, or a relay node device for relaying the optical path. This judgment is performed by referring to the self node ID which has been written in the ROM 310 in advance, and comparing it with the start point node and end point node IDs of the reserve packet. Responding to the end of this judgment, the wavelength reserve processing in S100 is executed. By executing the processing in the wavelength reserve step in S100, which will be described below, in each of the start point node device, end point node device and relay node device respectively, an optical path is set between the start point node device and the end point node device.

The processing in the wavelength reserve step in S100 is different for each start point node device, end point node device and relay node device, so a respective case will be described.

(1) In the Case of Start Point Node Device

Figure 7A:
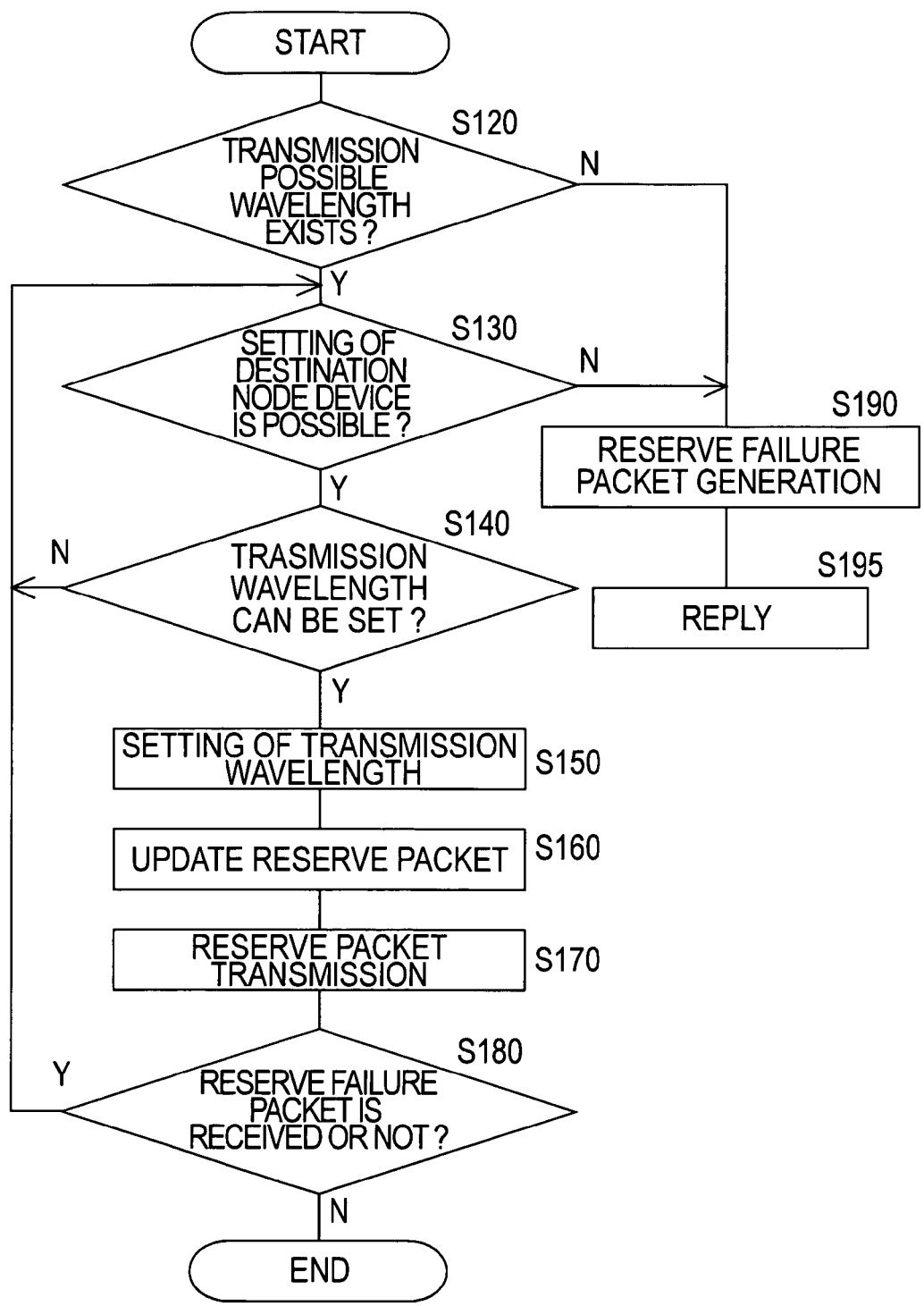
FIGS. 7A, B and C are flow charts (Part 2) depicting the processing flow in the node device in the first embodiment of the present invention, where

First the processing in the start point node device will be described with reference to FIG. 7A. The start point node device has received the reserve packet from the management device in S10.

In the transmission possible wavelength acquisition step in S120, the transmission possible wavelength acquisition means 346 judges whether a transmission possible wavelength exists or not, and acquires the transmission possible wavelength. In this step, responding to the result of the above mentioned node judgment, the transmission possible wavelength acquisition means 346 reads the optical path state table 324 stored in the RAM 320. In each node device 100, wavelengths correspond to each of the plurality of internal interfaces 182 of the router 180 one-to-one. And a destination node device has been determined for each wavelength. Therefore for an internal interface which has already been transmitting, transmission to another node device cannot be assigned. In other words, the wavelength corresponding to the internal interface which is not performing transmission is the transmission possible wavelength.

If a transmission possible wavelength exists, the processing in S130 is performed next. If transmission is being performed in all the internal interfaces, in other words if there is not a transmission possible wavelength, reserve is impossible, so the processing in S190 is performed.

In the reserve failure packet generation step in S190, responding to the judgment that there is not a transmission possible wavelength, the reserve failure packet generation means 362 generates a reserve failure packet. In this step, the reserve failure packet generation means 362 reads the reserve failure packet ID which has been written in ROM in advance as an ID for indicating the reserve failure packet. Then the reserve failure packet generation means 362 updates the reserve packet ID assigned to the reserve packet written in the RAM 320 to the reserve failure packet ID, so as to generate the reserve failure packet. In the packet reply step in S195 after S190, the packet transmission means 334 reads the reserve failure packet from the RAM 320, and replies it to the management device, which is the reserve packet transmission source.

In the destination node setting step in S130, responding to the judgment that the above mentioned transmission possible wavelength exists, the destination node setting means 348 judges whether the setting of the destination node device is possible, and temporarily sets a destination node device. In this step, the destination node setting means 348 reads the cost matrix 312 from the ROM 310, and searches the node devices constituting the optical communication network which are adjacent to the start point node device. This searching will be described later.

If a reserve failure packet has already been received from a node device of the adjacent node devices, the destination node setting means 348 registers the transmission source node device of this reserve failure packet in the RAM 320 as a transmission impossible node device. The destination node setting means 348 registers the adjacent node devices excluding the transmission impossible node devices in the RAM 320 as the transmission possible nodes. If the number of transmission possible node devices is 1, then the destination node setting means 348 temporarily sets the transmission possible node device as the destination node device. If there is a plurality of transmission possible node devices, on the other hand, the destination node setting means 348 temporarily sets a node device of which numeric to indicate the cost is the lowest as the destination node device. After the temporary setting of the destination node device, the processing in S140 is executed. If the tentative destination node device cannot be set, the process in S190 and S195 are executed regarding this as reserve impossible.

In the transmission wavelength setting step in S140 and S150, the transmission wavelength is temporarily set.

In S140, the transmission wavelength setting means 350 judges whether a transmission wavelength can be set for the tentative destination node device. In this step, the transmission wavelength setting means 350 refers to the link state table 322 read from the RAM 320, and checks which wavelengths are used in the optical fiber connected to the tentative destination node device. Out of the transmission possible wavelengths acquired in the transmission possible wavelength acquisition step in S120, a wavelength which is not used in the optical fiber connected to the tentative destination node device can be set as the transmission wavelength. If a wavelength that can be set exists, the processing in S150 is executed continuously. If there is not a wavelength that can be set, on the other hand, this tentative destination node device is registered in the RAM 320 as the transmission impossible node device, and processing in S130 is executed again.

Then in S150, the transmission wavelength setting means 350 registers the transmission wavelength in the RAM 320 for temporary setting. If there are a plurality of wavelengths that can be set, a wavelength of which wavelength ID is the smallest, for example, is temporarily set as the transmission wavelength. Responding to the temporary setting of the transmission wavelength, processing in S160 is executed.

In the reserve packet update step in S160, the reserve packet update means 338 accesses the RAM 320, and updates the transmission wavelength ID of the reserve packet in the link state table 322 to the wavelength ID of the transmission wavelength which is temporarily set this time, so as to update the reserve packet.

In the reserve packet transmission step in S170, responding to the update of the reserve packet, the packet transmission means 334 reads the updated reserve packet from the RAM 320, and sends it to the tentative destination node device.

In the reserve failure packet receive step in S180, the packet transmission means 334 confirms the transmission of the updated reserve packet, then the packet receive means 332 judges whether the reserve failure packet is received or not. If the packet receive means 332 does not receive the reserve failure packet, processing in the node device ends. If the packet receive means 332 received the reserve failure packet, on the other hand, the tentative destination node device is registered in the RAM 320 as a transmission impossible node device, and processing in S130 is executed again. If the packet receive means 332 does not receive the reserve failure packet, a path of which the start point node device is the self node device can be set. In this case, the start point node device receives the optical path setting signal after path reservation in the entire optical communication network is completed. Therefore it can be judged whether the reserve failure packet is received or not depending on which one of the receive failure packet and the optical path setting signal the packet receive means 332 receives.

(2) In the Case of End Point Node Device

Figure 7B:
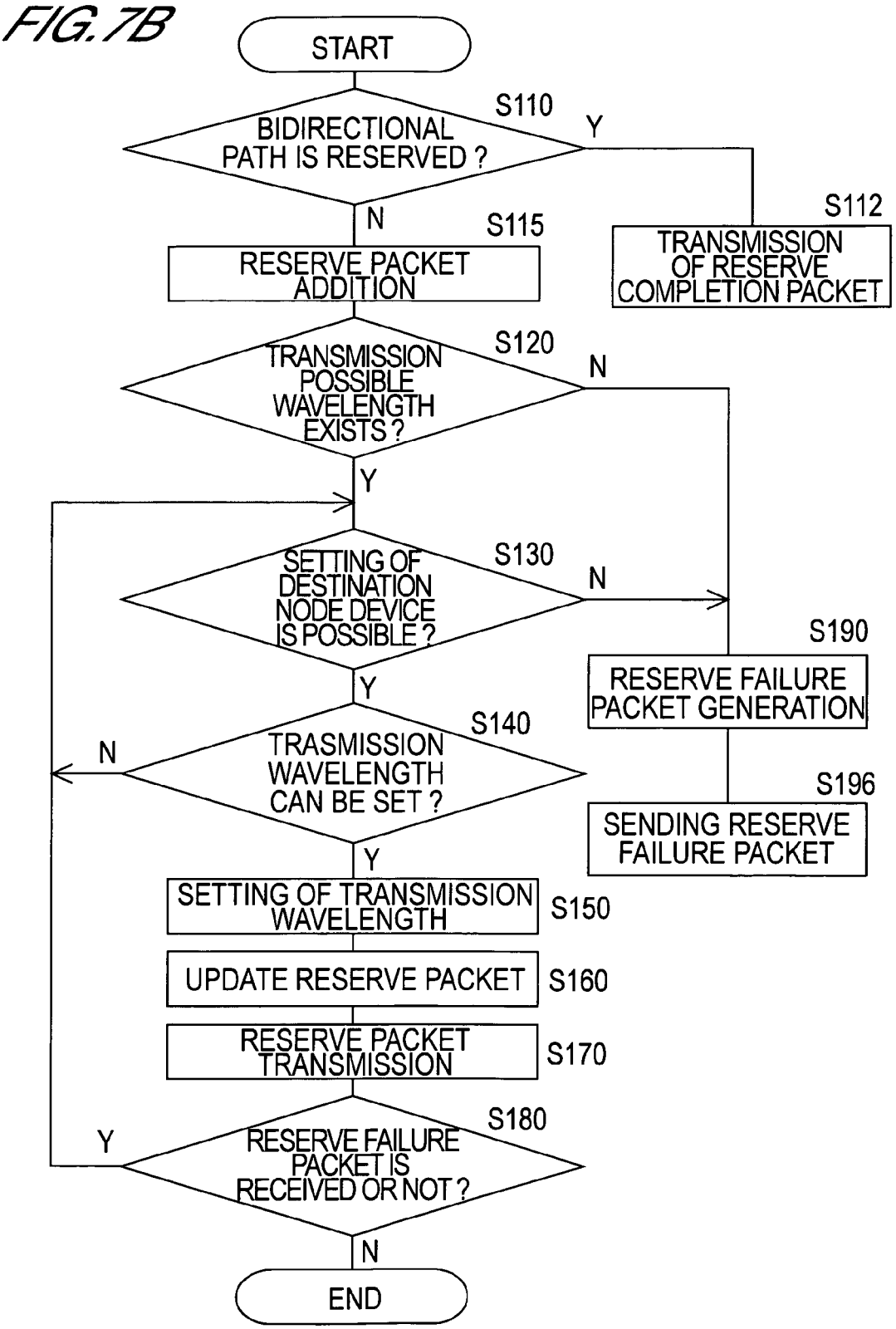
FIG. 7B shows the processing flow in the end point node device.

Now the processing in the end point node device will be described with reference to FIG. 7B.

In the established path judgment step in S110, the established path judgment means 342 judges whether bidirectional optical paths have been reserved or not. If the reserve packet includes information on 2 sets of a start point and end point, it is judged that the bidirectional optical paths have been reserved. If the reserve packet includes information on 1 set of a start point and end point, then it is judged that the bidirectional optical paths have not been reserved. If the bidirectional optical paths have been set, a reserve completion packet is generated and sent to the management device, and is registered in the RAM 320 in the reserve completion packet transmission step in S112. If bidirectional optical paths have not been reserved, the processing in S115 is executed next. If bidirectional optical paths are not set, the processing in S112 is executed without executing the established path judgment step in S110.

In the reserve packet addition step in S115, the reserve packet addition means 336 adds the reserve packet, and registers it in the RAM 320, as described later. The reserve packet to be added includes information on a new start point and new end point. The node IDs of the new start point and new end point are node IDs of the end point and start point of the reserve packet before being added. In other words, the start point and the end point are reversed between the reserve packet before being added and the reserve packet to be added. The wavelength ID, transit node ID and reserve possibility judgment flag of the reserve packet are all "0". After the reserve packet is added, processing from S120 to S180 is executed in the same way as the processing in the start point node device described with reference to FIG. 7A, only the end point node device is now a new start point node device.

After the reserve failure packet is generated in S190, the packet transmission means 334 sends the reserve failure packet to the management device directly, or via the relay node device using a one directional optical path which has been set in S196.

(3) In the Case of Relay Node Device

Figure 7C:
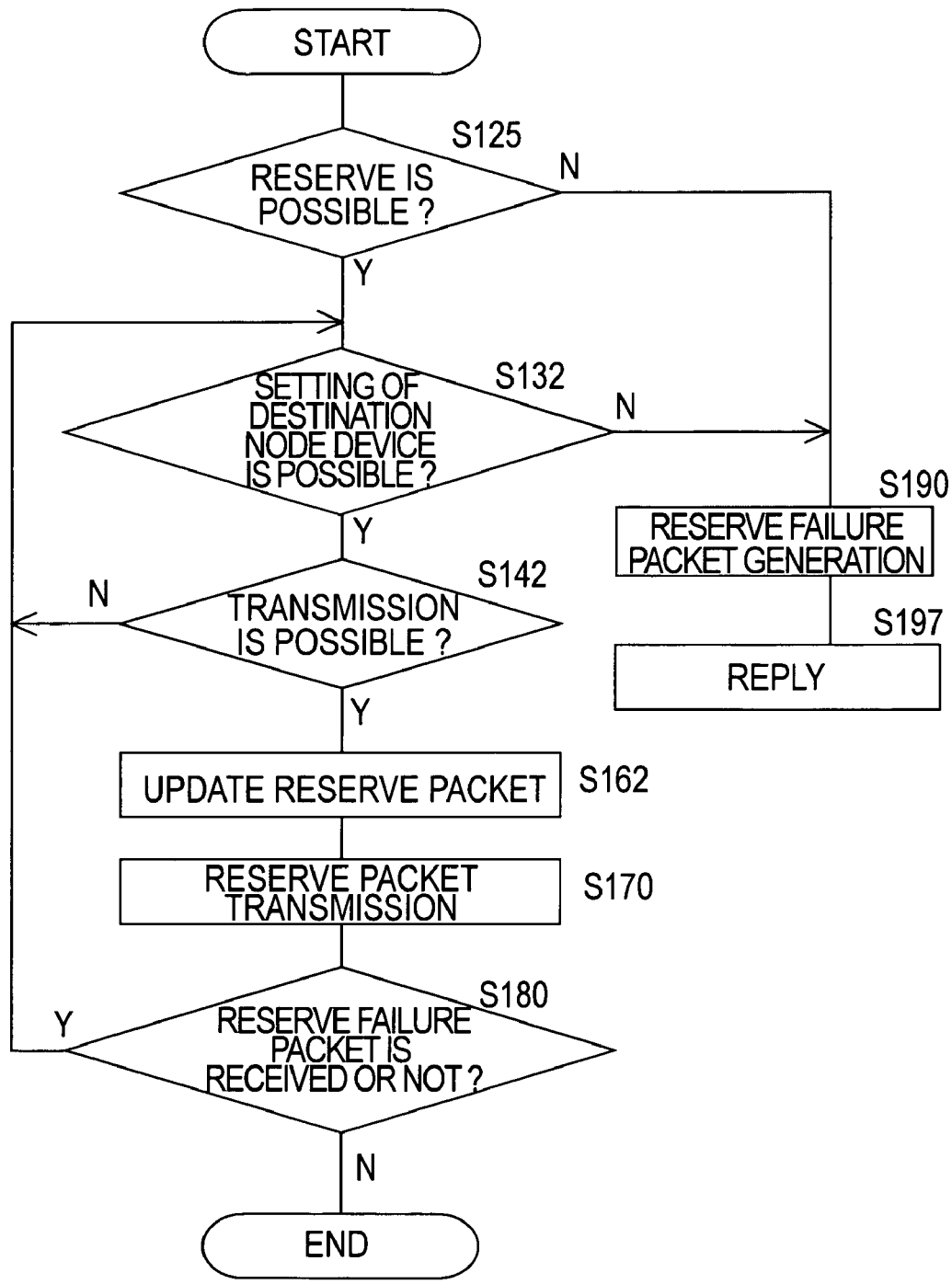
FIG. 7C shows the processing flow in the relay node device.

Now the processing in the relay node device will be described with reference to FIG. 7C.

In the reserve possibility judgment step in S125, the reserve possibility judgment means 344 reads a specified value which has been recorded in the ROM 310 in advance, and compares it with a reserve possibility flag included in the reserve packet sent from the node device in the previous stage. This specified value is a criteria value to judge whether reserve is possible. If the reserve possibility flag is smaller than the specified value, it is judged that the optical path indicated by the reserve packet can be reserved, and the processing in S132 is executed. In this example, the physical hop count is used as the reserve possibility flag, and the maximum physical hop count is set to "3" as the specified value. In the case of the optical communication network shown in FIG. 1, if a shortest path is set between node devices which are most distant from each other (e.g. between N1 and N9), the physical hop count is "3". Therefore by setting the maximum physical hop count to "3", a loop of the optical path can be prevented.

If the reserve possibility flag is more than the specified value, the reserve possibility judgment means 344 judges that the optical path indicated by the reserve packet cannot be reserved. Responding to the judgment of reserve impossible, the reserve packet generation means 362 generates a reserve failure packet in S190. Then in S197, the packet transmission means 334 replies the reserve failure packet to the transmission source node device of the reserve packet.

In the destination node setting step in S132, the destination node setting means 348 judges whether the setting of the destination node device is possible. In this judgment, responding to the judgment of reserve possible in S125, the destination node setting means 348 refers to the cost matrix 312 stored in the ROM 310, and searches the adjacent node devices adjacent to the relay node device. Then the destination node setting means 348 registers the start point node device and transit node device included in the reserve packet in the RAM 320 as transmission impossible node devices. If the relay node device has already received a reserve failure packet, the destination node setting means 348 judges the transmission source node device of this reserve failure packet also as a transmission impossible node device, and registers it in the RAM 320. The destination node setting means 348 registers the searched adjacent node devices excluding the transmission impossible node device in the RAM 320 as transmission possible node devices. If the number of transmission possible node devices is 1, then the destination node setting means 348 temporarily sets the transmission possible node device as the destination node device. If there is a plurality of transmission possible node devices, on the other hand, the destination node setting means 348 temporarily sets a node device of which cost is the lowest as the destination node device. After the temporary setting of the destination node device, the processing in S142 is executed. If there is not a transmission possible node device, the optical path cannot be reserved, so process in S190 and S197 are executed.

In the transmission possibility judgment step in S142, the transmission possibility judgment means 352 judges whether transmission is possible to the tentative destination node device or not. In this judgment, the transmission possibility judgment means 352 refers to the link state table 322 read from the RAM 320, and checks which wavelengths are used in the optical fiber via which transmission is performed to the tentative destination node device. In this case, if the transmission wavelength included in the reserve packet is not in use, it is judged that this transmission wavelength can be transmitted. If this transmission wavelength can be transmitted as a result of the judgment, the processing in S162 is executed. If transmission is impossible, the transmission possibility judgment means 352 registers the tentative destination node device in the RAM 320 as the transmission impossible node, and executes processing in S132 again.

In the reserve packet update step in S162, the reserve packet update means 338 updates the reserve packet. Specifically, the reserve packet update means 338 accesses the RAM 320, and writes the self node ID in the column of the transit node device in the reserve packet, and adds "1" to the numeric in the column of the reserve possibility judgment flag.

In the reserve packet transmission step in S170, responding to the update of the reserve packet, the packet transmission means 334 reads the updated reserve packet from the RAM 320, and sends it to the tentative destination node device.

In the reserve failure packet receive step in S180, the packet update means 334 confirms transmission of the updated reserve packet. Then the packet receive means 332 judges whether the reserve failure packet is received or not. If the packet receive means 332 does not receive the reserve failure packet, processing in the node device ends. If the packet receive means 332 received the reserve failure packet, on the other hand, the tentative destination node device is registered as a transmission impossible node device, and processing in S132 is executed again. If the reserve failure packet is not received, a path which relays the self node device can be set, so the optical path setting signal is received after the path reserve of the entire optical communication network is completed. Therefore it can be judged whether the reserve failure packet is received or not depending on which one of the reserve failure packet and the optical path setting signal the packet receive means receives.

By the optical path setting device for setting an optical path in an optical communication network, an optical communication network comprising this optical path setting device, optical path reserve method and program thereof according to the first embodiment, so an increase in processing time due to the expansion of the network scale can be suppressed since the distributed control method is used.

Also path selection and wavelength selection are performed simultaneously, therefore the probability of an occurrence of blocking can be decreased. As a result, a trial count due to a wavelength reserve failure can be decreased, so the time required for path setting can be decreased.

FIRST EXAMPLE

An example of setting a new optical path in an optical communication network in which a plurality of optical paths are set will be described with reference to FIG. 1 to FIG. 10 and Table 1 to Table 8.

Figure 8:
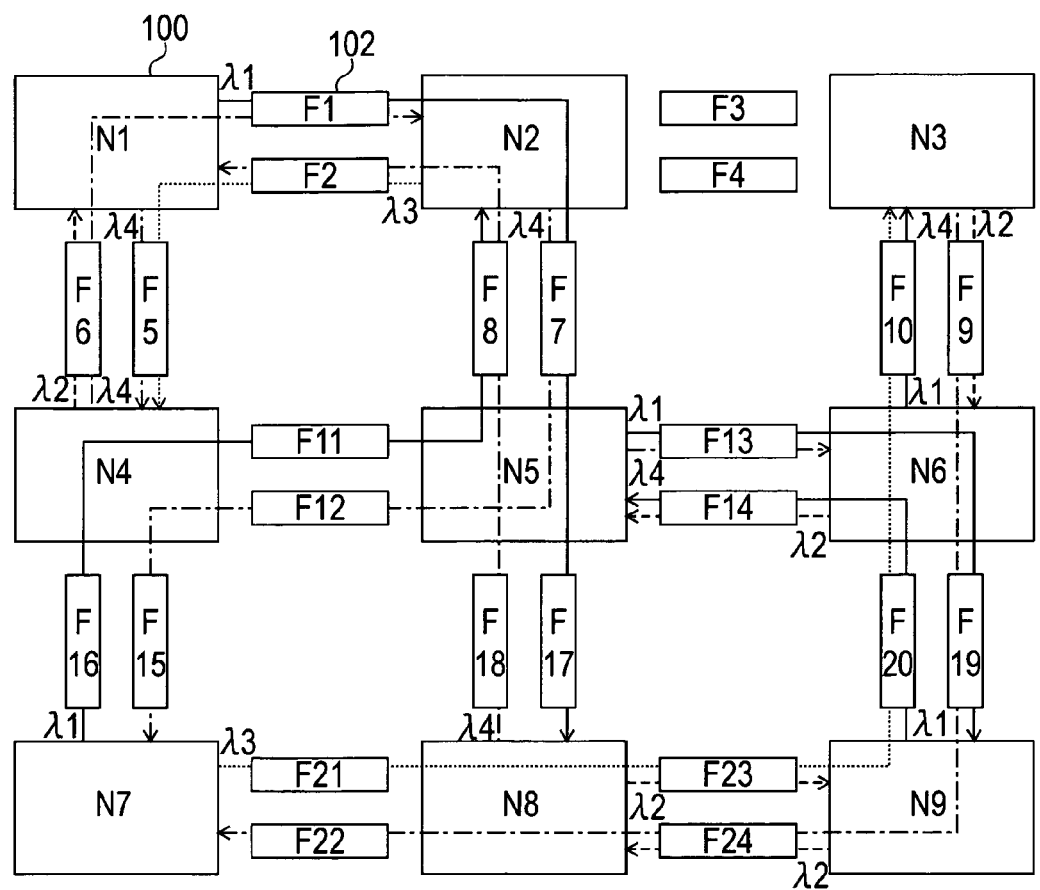
FIG. 8 is a diagram depicting the initial optical path layout.
Figure 10:
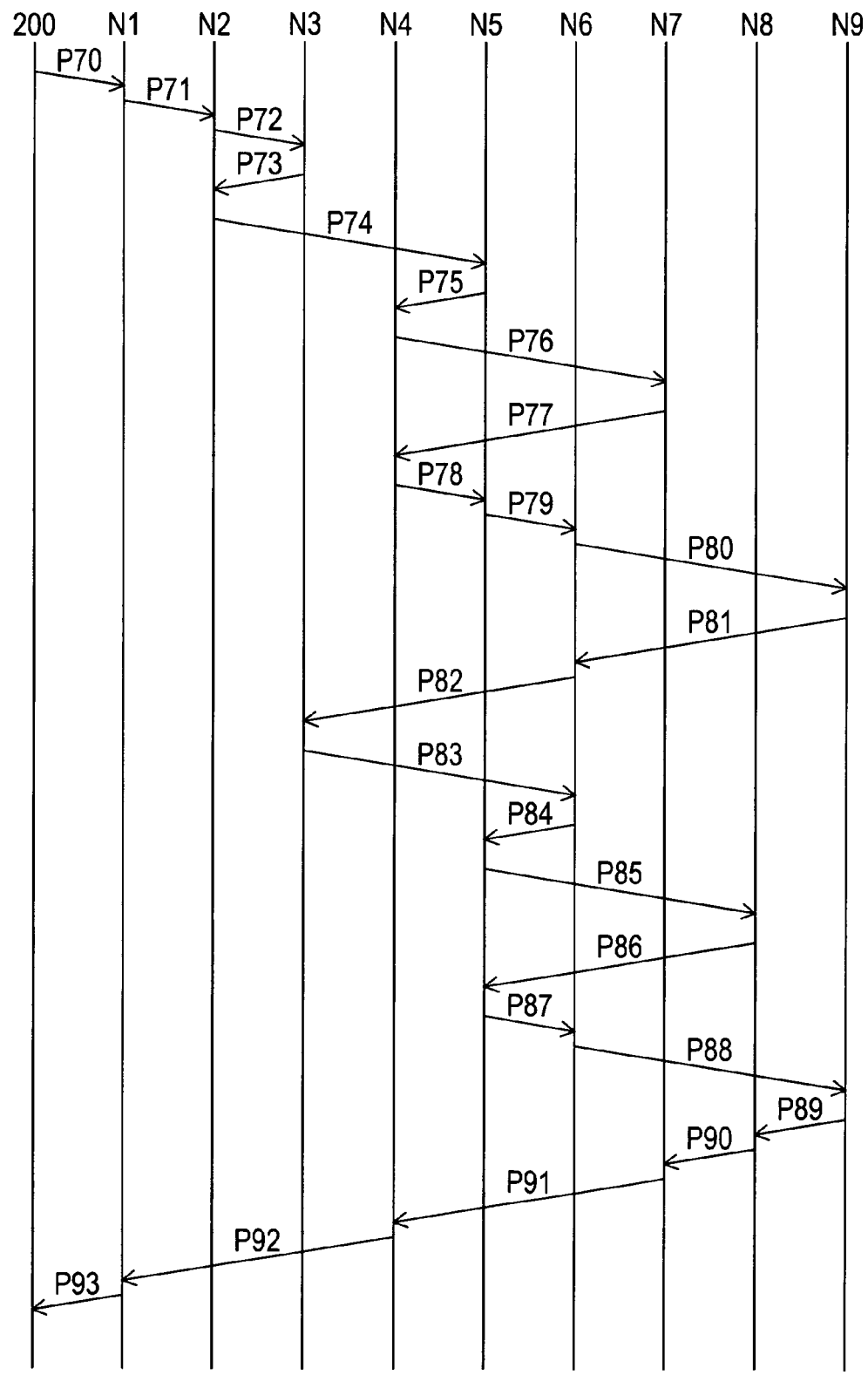
FIG. 10 is a sequence diagram depicting the wavelength reserve method of the first embodiment of the present invention.

In the initial state, bidirectional optical paths are set between 9 sets of node devices. A pair of bidirectional optical paths, which is pair optical paths in opposite directions, which are set in each node device N1, N2, . . . N9, pass through the same node devices. In this example, it is assumed that there are 4 transmission possible wavelengths, $\lambda 1$ to $\lambda 4$. In FIG. 8, the arrow of the solid line indicates the optical path of which the wavelength ID is 1 ($\lambda 1$), the arrow of the broken line indicates a path of which the wavelength ID is 2 ($\lambda 2$), the arrow of the dotted line indicates a path of which the wavelength ID is 3 ($\lambda 3$), and the arrow of the dashed line indicates a path of which the wavelength ID is 4 ($\lambda 4$).

Specifically, between N1 and N4, an optical path from N1 to N4 is set with $\lambda 4$, and an optical path from N4 to N1 is set with $\lambda 2$. Between N1 and N8, an optical path from N1 to N8 via N2 and N5 is set with $\lambda 1$, and an optical path from N8 to N1 via N5 and N2 is set with $\lambda 4$. Between N2 and N4, an optical path from N2 to N4 via N1 is set with $\lambda 3$, and an optical path from N4 to N2 via N1 is set with $\lambda 4$. Between N2 and N7, an optical path from N2 to N7 via N5 and N4 is set with $\lambda 4$, and an optical path from N7 to N2 via N4 and N5 is set with $\lambda 1$. Between N3 and N6, an optical path from N3 to N6 is set with $\lambda 2$, and an optical path from N6 to N3 is set with $\lambda 1$. Between N3 and N7, an optical path from N3 to N7 via N6, N9 and N8 is set with $\lambda 4$, and an optical path from N7 to N3 via N8, N9 and N6 is set with $\lambda 3$. Between N5 and N6, an optical path from N5 to N6 is set with $\lambda 4$, and an optical path from N6 to N5 is set with $\lambda 2$. Between N5 and N9, an optical path from N5 to N9 via N6 and an optical path from N9 to N5 via N6 are both set with $\lambda 1$. Between N8 and N9, an optical path from N8 to N9 and an optical path from N9 to N8 are both set with $\lambda 2$.

FIG. 9A to FIG. 9I show link state tables with N1 to N9 respectively as examples of a link state table. A link state table has a node ID, fiber ID and wavelength ID. The link state table of N1 shows that N1 sends optical signals of which the wavelength ID is 1 and 4, that is $\lambda 1$ and $\lambda 4$, to the node device of which node ID is 2, that is N2, via the fiber of which the fiber ID is 1, that is F1. In other words, N1 is adjacent to N2 and N4, and an optical signal is sent from N1 to N2 via F1. Here the optical signal which is sent to N2 via F1 includes wavelength components $\lambda 1$ and $\lambda 4$. Also an optical signal is sent from N1 to N4 via F5. Here the optical signal which is sent to N4 via F5 includes wavelength components $\lambda 3$ and $\lambda 4$ (FIG. 9A).

Tables 1 to 8 show the start point node device, end point node device, transmission wavelength, transit node device, and reserve possibility judgment flag as a part of the information of the reserve packet. The reserve possibility judgment flag may not be included in the reserve packet.

A new optical path is set between N1 and N9 in the optical path layout in the initial state. The administrator operates the input means of the management device 200 (see FIG. 2), and inputs 2 node IDs 1 and 9, for example. If bidirectional optical paths are set, the node device of which node ID is smaller is set to be the start point, and the node device of which node ID is greater is set to be the end point. Therefore in this example, the node device of which node ID is "1", that is N1, becomes the start point, and the node device of which node ID is "9", that is N9, becomes the end point. Responding to the input of the node IDs, the management device 200 generates the reserve packet P70 (see Table 1 and FIG. 10). At this time, the wavelength, transit node device and reserve possibility judgment flag are all 0. The reserve packet P70 is sent to N1.

TABLE 1

| START | END | WAVELENGTH | TRANSIT | FLAG |
|---|---|---|---|---|
| 1 | 9 | 0 | 0 | 0 |

In S10, the start point node device N1 receives the reserve packet P70 from the management device 200.

In S20, the node device judgment is executed, then the wavelength reserve processing in S100 is executed. Here N1 is the start point node device, so the processing described above with reference to FIG. 7A is executed. Specifically the following processing is executed.

In S120, the transmission possible wavelength acquisition means 346 judges whether a transmission possible wavelength exists or not. Since N1 is transmitting with $\lambda 1$ and $\lambda 4$, $\lambda 2$ and $\lambda 3$ are transmission possible wavelengths.

In S130, the destination node setting means 348 temporarily sets the destination node device. Referring to the cost matrix shown in FIG. 5, the node devices adjacent to N1 is N2 of which cost is 1, and N4 of which cost is 4. Here there is not a transmission impossible node device, so the destination node setting means 348 temporarily sets N2 of which cost is smaller as the destination node device.

In S140 and S150, the transmission wavelength is set to the tentative destination node device. In the link state table (FIG. 9A) read from the RAM of N1, the fiber ID for transmission to N2 is 1, and $\lambda 1$ and $\lambda 4$ are used. There are two transmission possible wavelengths, $\lambda 2$ and $\lambda 3$, so the transmission wavelength setting means 350 temporarily sets $\lambda 2$ of which wavelength ID is smaller as the transmission wavelength.

In S160, the reserve packet is updated. The reserve packet update means 338 writes "2" of the transmission wavelength ID in the column of the wavelength ID of the reserve packet, so as to update the reserve packet (Table 2). Since N1 is a start point node device, the reserve packet update means 338 does not update the columns of the transit node device and the reserve possibility judgment flag.

TABLE 2

| START | END | WAVELENGTH | TRANSIT | FLAG |
|---|---|---|---|---|
| 1 | 9 | 2 | 0 | 0 |

In S170, the packet transmission means 334 sends the updated reserve packet P71 to N2, which is the tentative destination node device.

In S10, N2 receives the reserve packet P71 from N1.

In S20, node device judgment is performed, and then the wavelength reserve processing in S100 is performed. Since N2 is a relay node device, the processing described with reference to FIG. 7C is executed.

In S125, it is judged whether reserve is possible or not. Here the reserve possible flag is 0, and is smaller than the specified value 3, which is a criteria value of reserve possible or not, so it is judged that reserve is possible.

In S132, the destination node device is temporarily set. Referring to the cost matrix in FIG. 5, the node devices adjacent to N2 are N1 of which cost is 1, N3 of which cost is 2, and N5 of which cost is 3. Here N1, which is the start point node device, is a transmission impossible node device, and N3, of which cost is smaller in the adjacent node devices after excluding the transmission impossible node device, is temporarily set to the destination node device.

In S142, it is judged whether transmission is possible or not to the tentative destination node device. In the link state table (FIG. 9B) read from the RAM of N2, the fiber ID for transmission to N3 is 3, and there are not wavelengths in use. Therefore transmission is possible with λ2.

In S162, the reserve packet is updated. The reserve packet update means 338 writes N2 in the column of the transit node device since N2 is the relay node device, and adds 1 to the numeric in the column of the reserve possibility judgment flag, which results in 1, so as to update the reserve packet, as shown in Table 3.

TABLE 3

| START | END | WAVELENGTH | TRANSIT | FLAG |
|-------|-----|------------|---------|------|
| 1     | 9   | 2          | 2       | 1    |

In S170, the packet transmission means 334 sends the updated reserve packet P72 to N3, which is the tentative destination node device.

In S10, N3 receives the reserve packet P72 from N2.

In S20, node device judgment is performed, and then the wavelength reserve processing in S100 is performed. Since N3 is a relay node device, the processing described with reference to FIG. 7C is executed.

In S125, it is judged whether reserve is possible or not. Here the reserve possible flag is 1, and is smaller than the specified value 3, so the reserve possibility judgment means 348 judges that reserve is possible.

In S132, the destination node device is temporarily set. Referring to the above mentioned cost matrix, node devices adjacent to N3 are N2 of which cost is 2, and N6 of which cost is 3. Here N2, which is the transit node device, is a transmission impossible node device, and N6, which is the adjacent node device after excluding the transmission impossible node device, is temporarily set to the destination node device.

In S142, the destination node setting means 348 judges whether transmission is possible or not to the destination node device. In the link state table (FIG. 9C) read from the RAM of N3, the fiber ID for transmission to N6 is 9, and λ2 and λ4 are used. Therefore transmission is impossible with λ2.

Responding to the judgment of transmission impossible, in S190 and S197, the reserve failure packet generation means 362 generates the reserve failure packet P73, then the packet transmission means 334 replies the reserve failure packet P73 to N2, which is the transmission source node device of the reserve packet P72.

N2, which received the reserve failure packet P73, executes the processing in S132 again for the reserve packet P71 received from N1.

In S132, the destination node device is temporarily set. Node devices adjacent to N2 are N1, N3 and N5. Here N1 which is a start point, and N3 which is a transmission source of the reserve failure packet, are the transmission impossible nodes, and N5, after excluding the transmission impossible node devices, is temporarily set to the destination node device.

In S142, the destination node setting means 348 judges whether transmission is possible or not to the tentative destination node device. In the link state table read from the RAM of N2, the fiber ID for transmission to N5 is 7, and the wavelengths in use are λ1 and λ4. Therefore transmission is possible with λ2.

In S162, the reserve packet update means 338 updates the reserve packet. The reserve packet acquired here includes the same information as the reserve packet in which N3 is temporarily set to the destination node device shown in Table 3.

In S170, the packet transmission means 334 sends the updated reserve packet P74 to N5, which is the tentative destination node device.

In S10, N5 receives the reserve packet P74 from N2.

In S20, node device judgment is performed, and then the wavelength reserve processing in S100 is performed. Since N5 is a relay node device, the processing described with reference to FIG. 7C is executed.

In S125, it is judged whether reserve is possible or not. Here the reserve possible flag is 1, and is smaller than the specified value 3, so the reserve possibility judgment means 344 judges that reserve is possible.

In S132, the destination node device is temporarily set. Referring to the above mentioned cost matrix, node devices adjacent to N5 are N2 of which cost is 3, N4 of which cost is 2, N6 of which cost is 4, and N8 of which cost is 5. Therefore the destination node setting means 348 regards N2, which is the transit node device, as a transmission impossible node device, and temporarily sets N4 of which cost is smallest among the adjacent node devices after excluding the transmission impossible node device as the destination node device.

In S142, the transmission possibility judgment means 352 judges whether transmission is possible or not to the tentative destination node device. In the link state table (FIG. 9E) read from the RAM of N5, the fiber ID for transmission to N4 is 12, and λ4 is the wavelength in use. Therefore transmission is possible with λ2.

In S162, the reserve packet update means 338 writes 5 in the column of the transit node device of the reserve packet P74, and adds 1 to the numeric in the column of the reserve possibility judgment flag column, which results in 2, so as to update the reserve packet, as shown in Table 4.

TABLE 4

| START | END | WAVELENGTH | TRANSIT | FLAG |
|-------|-----|------------|---------|------|
| 1     | 9   | 2          | 2, 5    | 2    |

In S170, the packet transmission means 334 sends the updated reserve packet P75 to N4 which is the tentative destination node device.

In S10, N4 receives the reserve packet P75 from N5.

In S20, node device judgment is performed, and then the wavelength reserve processing in S100 is performed. Since N4 is a relay node device, the processing described with reference to FIG. 7C is executed.

In S125, it is judged whether reserve is possible or not. Here the reserve possibility flag is 2, and is smaller than the specified value 3, so the reserve possibility judgment means 344 judges that reserve is possible.

In S132, the destination node device is temporarily set. Referring to the above mentioned cost matrix, node devices adjacent to N4 are N1 of which cost is 4, N5 of which cost is 2, and N7 of which cost is 3. Therefore the destination node setting means 348 regards N1, N2 and N5, which are the start point node device or transit node device, as transmission impossible node devices, and temporarily sets N7, which is an adjacent node device after excluding the transmission impossible node devices, as the destination node device.

In S142, the transmission possibility judgment means 352 judges whether transmission is possible or not to the tentative destination node device. In the link state table (FIG. 9D) read from the RAM of N4, the fiber ID for transmission to N7 is 15, and λ4 is used. Therefore transmission is possible with λ2.

In S162, the reserve packet update means 338 writes 4 in the column of the transit node device, and adds 1 to the numeric in the column of the reserve possibility judgment flag, which results in 3, so as to update the reserve packet, as shown in Table 5.

TABLE 5

| START | END | WAVELENGTH | TRANSIT | FLAG |
|-------|-----|------------|---------|------|
| 1 | 9 | 2 | 2, 5, 4 | 3 |

In S170, the packet transmission means 334 sends the updated reserve packet P76 to N7, which is the tentative destination node device.

In S10, N7 receives the reserve packet P76 from N4.

In S20, the node judgment means 320 performs node device judgment, and then the wavelength reserve processing in S100 is performed. Since N7 is a relay node device, the processing described with reference to FIG. 7C is executed.

In S125, the reserve possibility judgment means 344 judges whether reserve is possible or not. Here the reserve possible flag is 3, which is the specified value 3 or more, so it is judge that reserve is impossible.

In S190 and S197, the reserve failure packet P77 is generated, then the reserve failure packet P77 is replied to N4, which is the transmission source of the reserve packet P76.

N4, which received the reserve failure packet P77, executes the processing in S132 again.

In S132, the destination node setting means 348 temporarily sets the destination node device. Node devices adjacent to N4 are N1, N5 and N7. Here N1 is the start point node device, N5 is a relay node device, and N7 is the transmission source of the reserve failure packet, so they are all transmission impossible node devices, and there is not a transmission possible node device.

In S190 and S197, the reserve failure packet generation means 362 generates a new reserve failure packet P78, then the packet transmission means 334 replies the new reserve failure packet P78 to N5, which is the transmission source of the reserve packet P75 have been stored in RAM.

N5, which received the reserve failure packet P78, executes the processing in S132 again for the reserve packet P74 received from N2.

In S132, the destination node setting means 348 judges whether the destination node device can be set or not. Referring to the above mentioned cost matrix, node devices adjacent to N5 are N2, N4 N6 and N8. Here N2 which is a transit node device and N4 which is the transmission source of the reserve failure packet are transmission impossible node devices, so N6 of which cost is smaller, after excluding the transmission impossible node devices, is temporarily set as the destination node device.

In S142, the transmission possibility judgment means 352 judges whether transmission is possible or not to the destination node device. In the link state table (FIG. 9E) read from the RAM of N5, the fiber ID for transmission to N6 is 13, and λ1 and λ4 are the wavelengths in use. Therefore transmission is possible with λ2.

In S162, the reserve packet update means 338 updates the reserve packet P74. The updated reserve packet P79 includes the same information as the reserve packet in which N4 is the tentative destination node device, as shown in Table 4.

In S170, the packet transmission means 334 sends the updated reserve packet P79 to N6, which is the tentative destination node device.

In S10, N6 receives the reserve packet P79 from N5.

In S20, the node judgment means 340 performs the node device judgment, and then the wavelength reserve processing in S100 is performed. Since N6 is a relay node device, the processing described with reference to FIG. 7C is executed.

In S125, the reserve possibility judgment means 344 judges whether reserve is possible or not. Here the reserve possibility flag is 2, which is smaller than the specified value 3, so it is judged that reserve is possible.

In S132, the destination node setting means 348 temporarily sets the destination node device. Referring to the above mentioned cost matrix, node devices adjacent to N6 are N3 of which cost is 3, N5 of which cost is 4, and N9 of which cost is 1. Here N9, which is the end point node device, is an adjacent node device, so the destination node setting means 348 temporarily sets N9 as the destination node device.

In S142, the transmission possibility judgment means 352 judges whether transmission is possible or not to the destination node device. In the link state table (FIG. 9F) read from the RAM of N6, the fiber ID for transmission to N9 is 19, and λ4 is in use. Therefore transmission is possible with λ2.

In S162, the reserve packet update means 338 writes 6 in the column of the transit node device, and adds 1 to the numeric in the column of the reserve possibility judgment flag, which results in 3, so as to update the reserve packet, as shown in Table 6.

TABLE 6

| START | END | WAVELENGTH | TRANSIT | FLAG |
|-------|-----|------------|---------|------|
| 1 | 9 | 2 | 2, 5, 6 | 3 |

In S170, the packet transmission means 334 sends the updated reserve packet P80 to N9, which is the destination node device.

In S10, N9 receives the reserve packet P80 from N6.

In S20, the node device judgment is performed, and then the wavelength reserve processing in S100 is performed. Since N9 is the end point node device, the processing described with reference to FIG. 7B is executed.

In S110, the established path judgment means 342 judges whether bidirectional paths have been set. In this case, bidirectional paths have not been set, therefore, in S112, the reserve packet addition means 336 adds the reserve packet, and acquires the reserve packet shown in Table 7. The start point node ID and end point node ID of the reserve packet to be added are 9 of the end point node ID, and 1 of the start point ID of the reserve packet before being added. It is assumed that the wavelength ID, transit node ID and reserve possibility judgment flag of the reserve packet are all "0".

TABLE 7

| START | END | WAVELENGTH | TRANSIT | FLAG |
|-------|-----|------------|---------|------|
| 1 | 9 | 2 | 2, 5, 6 | 3 |
| 9 | 1 | 0 | 0 | 0 |

After adding the reserve packet, the above mentioned processing is repeated for the added reserve packet. As a result of transmitting and receiving the reserve packet or the reserve failure packets P81 to P91 between the node devices, an optical path is set from N9 to N8, N7 and N4 sequentially.

In S10, N1 receives the reserve packet P92 from N4. Table 8 shows the reserve packet P92.

TABLE 8

| START | END | WAVELENGTH | TRANSIT | FLAG |
|-------|-----|------------|---------|------|
| 1 | 9 | 2 | 2, 5, 6 | 3 |
| 9 | 1 | 3 | 8, 7, 4 | 3 |

In S20, the node judgment means 340 performs node device judgment, and then the wavelength reserve processing in S100 is performed. Since N1 is the end point node device, the processing described with reference to FIG. 7B is executed.

In S110, the established path judgment means 342 judges whether bidirectional paths have been set. Here bidirectional paths have been set, so the established path judgment means 342 generates the reserve completion packet P93, then the packet transmission means 334 sends the reserve completion packet to the management device. When the management device receives the reserve completion packet, the wavelength reserve completes. Then the reserved optical path is set in the optical communication network.

Second Embodiment

In the first embodiment, one destination node device is selected, and one wavelength is allocated to the node device, and the reserve packet is updated. While in the second embodiment, a plurality of destination node devices are selected, and all transmission possible wavelengths are allocated to each node device, and the reserve packet is updated. In the following description, description the same for the first embodiment will be omitted.

Figure 11A:
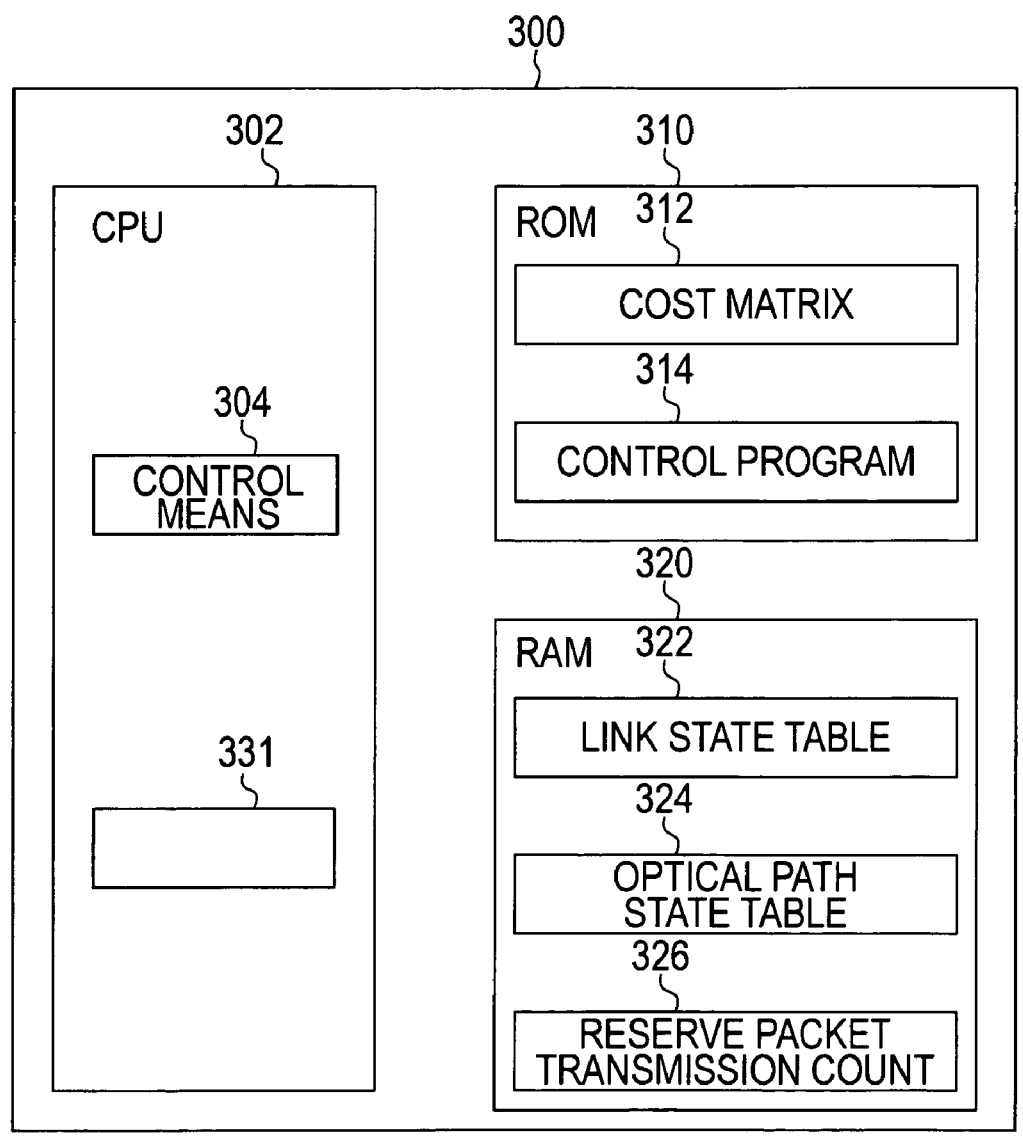
FIG. 11A is a block diagram depicting a configuration example of the control section according to the second embodiment of the present invention.
Figure 11B:
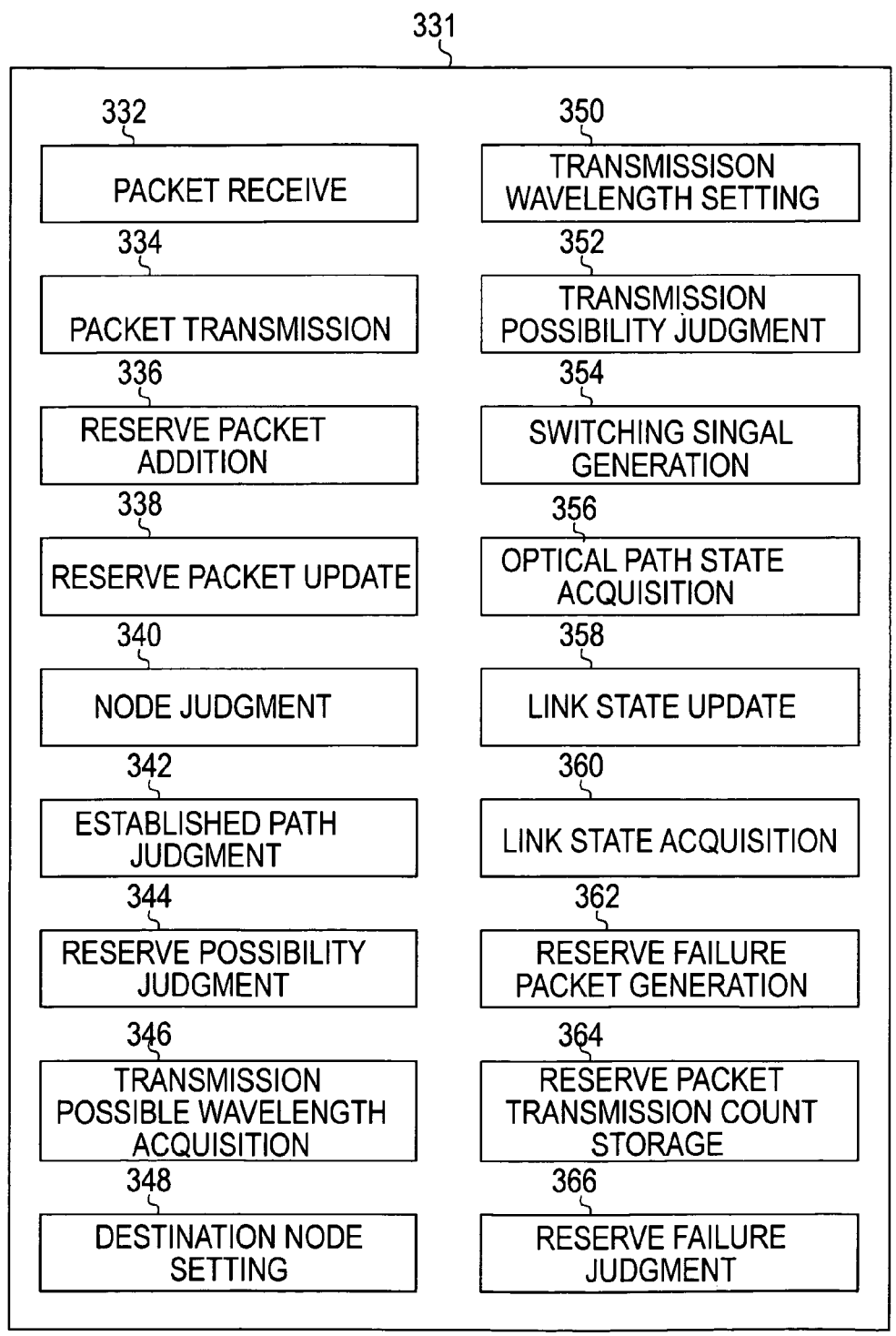
FIG. 11B is a block diagram depicting an example of the function means implemented by a CPU according to the second embodiment of the present invention.

The control section of the node device according to the second embodiment will be described with reference to FIG. 11A and FIG. 11B. The control section of the node device according to the second embodiment comprises a transmission wavelength change means 353, reserve packet transmission count storage means 364 and reserve failure judgment means 366, which is different from the control section of the node device according to the first embodiment, and the rest of the configuration is the same as the first embodiment, so description thereof will be omitted. The transmission wavelength change means 353, reserve packet transmission count storage means 364 and reserve failure judgment means 366 will be described later.

Now an optical path reserve method for setting a new optical path in the optical communication network where a plurality of optical paths are set will be described with reference to FIG. 6 and FIG. 12A to C.

The steps from receiving the reserve packet to performing node device judgment are the same as the processing in S10 and S20 of the first embodiment, described with reference to FIG. 6, so description thereof will be omitted.

In the method of the second embodiment as well, processing of the wavelength reserve step in S100 is different for each start point node device, end point node device and relay node device, just like the first embodiment, so a respective case will be described.

(1) Start Point Node Device

Figure 12A:
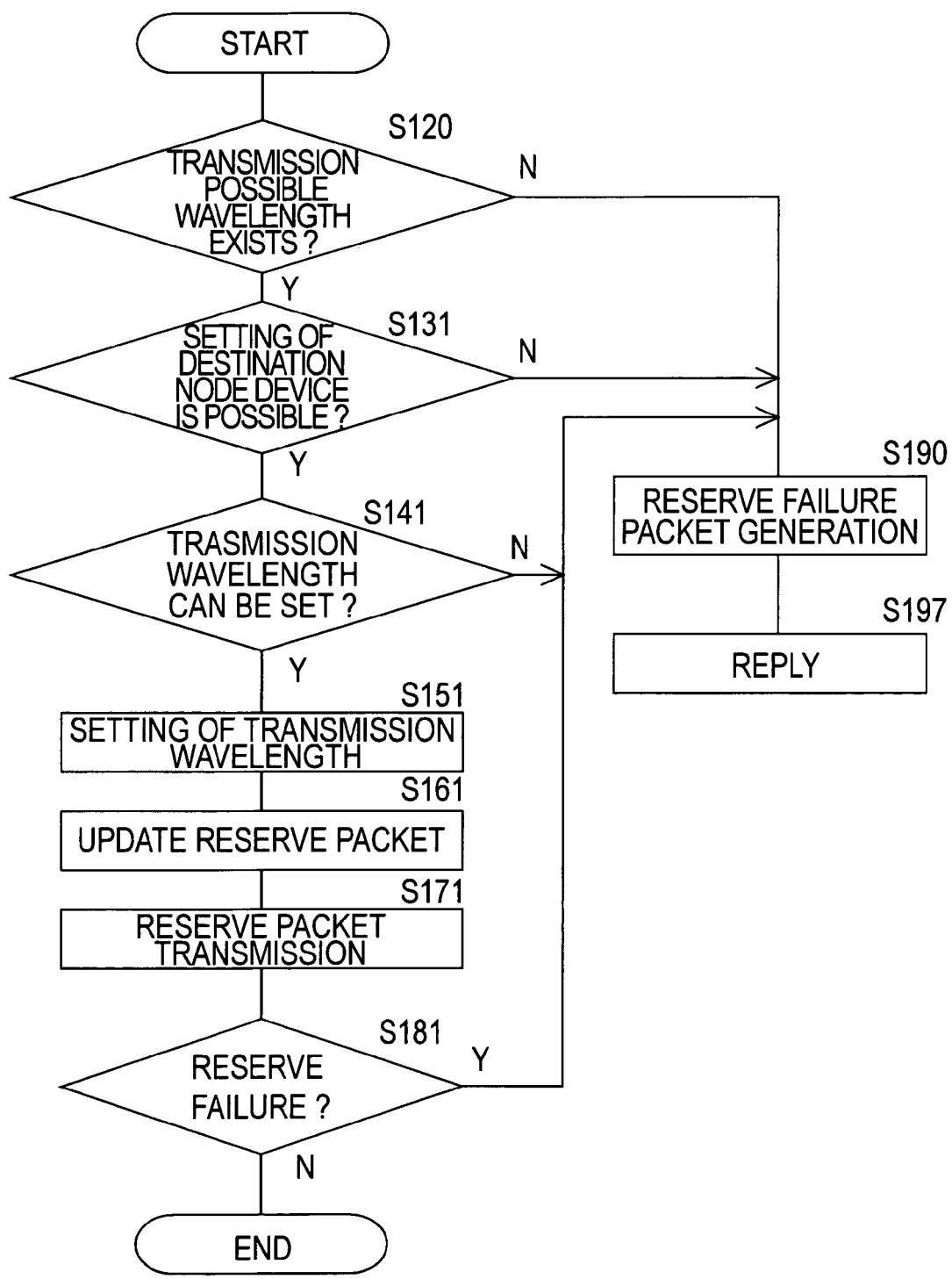
FIGS. 12A, B and C are flow charts (Part 3) depicting the processing flow in the node device in the second embodiment of the present invention, where

First the processing in the start point node device will be described with reference to FIG. 12A.

In the transmission possible wavelength acquisition step in S120, the transmission possible wavelength acquisition means 346 judges whether a transmission possible wavelength exists or not. In this step, responding to the result of the above mentioned node judgment, the transmission possible wavelength acquisition means 346 reads the optical path state table 324 stored in the RAM 320. In each node device, wavelengths correspond to each of the plurality of internal interfaces of the router one-to-one. And a destination node device has been determined for each wavelength. Therefore for the internal interface which has already been transmitting, transmission to another node device cannot be assigned. In other words, the wavelength corresponding to the internal interface, which is not performing transmission, is the transmission possible wavelength. If a transmission possible wavelength exists, the processing in S131 is performed next. If there is not a transmission possible wavelength, reserve is impossible, so the processing in S190 is performed.

In S190, the reserve failure packet generation means 362 generates a reserve failure packet. The reserve failure packet is generated by updating the reserve packet ID assigned to the reserve packet, for example. In S195 after S190, the packet transmission means 334 replies the reserve failure packet to the management device, which is the reserve packet transmission source.

In S131, it is judged whether the setting of the destination node device is possible. In this judgment, the destination node setting means 348 refers to the cost matrix 312 first, and searches adjacent node devices. Then if the adjacent node devices are transmission possible node devices, one or two or more transmission possible node devices are temporarily set as the destination node devices. After the temporary setting of the destination node device, the processing in S141 is performed. If there is not a transmission possible node device, reserve is impossible, so the processes in S190 and S195 are executed.

In the transmission wavelength setting step in S141 and S151, the transmission wavelength is set.

First in S141, the transmission wavelength setting means 350 judges whether a transmission possible wavelength exists for the tentative destination node device. In this judgment, the transmission wavelength setting means 350 refers to the link state table 322, and checks whether wavelengths which are not used exist or not for the node device which is set as the tentative destination node device. Here a wavelength which is not in use is a transmission possible wavelength. If a transmission possible wavelength exists, the processing in S151 is executed. If there is not a transmission possible wavelength, reserve is impossible, so the processes in S190 and S195 are executed.

Then in S151, the transmission wavelength setting means 350 temporarily sets the transmission possible wavelength as the transmission wavelength. If there are two or more transmission possible wavelengths, all of the two or more wavelengths are temporarily set as transmission wavelengths. Responding to the temporary setting of the transmission wavelengths, the processing in S161 is executed.

In the reserve packet update step in S161, the reserve packet update means 338 writes the wavelength ID of the transmission wavelength which was temporarily set in S150 in the column of the wavelength ID of the reserve packet so as to update the reserve packet.

In S171, if the updated reserve packet exists, the packet transmission means 334 sends the updated reserve packet to one or two or more tentative destination node devices. At this time, the reserve packet transmission count storage means 364 stores the reserve packet transmission count 326, which is the number of reserve packets which the packet transmission means 334 sent in the RAM 320.

In S181, the reserve failure judgment means 366 judges whether reserve failure occurred or not. If the packet receive means 332 did not receive the reserve failure pocket, or if the reserve failure packet was received but the receive count thereof is less than the reserve packet transmission count 326, reserve is regarded as possible, and the processing in the node device ends. If the reserve packet transmission count and the reserve failure packet receive count are the same, on the other hand, reserve is regarded as impossible, and the processes in S190 and S195 are executed. If a reserve failure packet is not received, a path which relays the self node device is set, so when the path setting of an entire optical communication network completes, the optical path setting signal is received. Therefore it can be judged whether the reserve failure packet was received or not depending on which one of the reserve failure packet and the optical path setting signal the packet receive means received.

(2) End Point Node Device

Figure 12B:
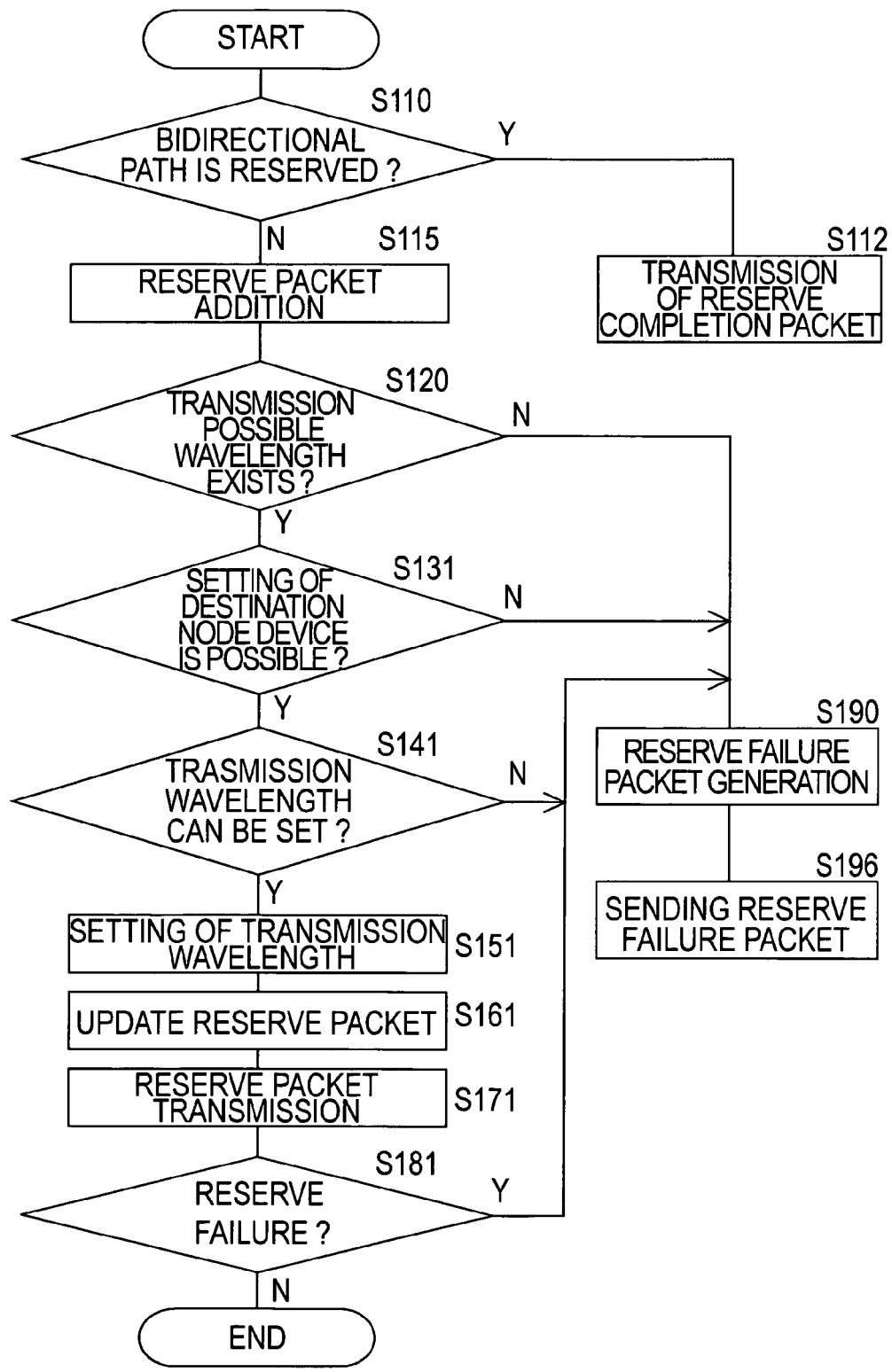
FIG. 12B shows the processing flow in the end point node device.

Now the processing in the end point node device will be described with reference to FIG. 12B.

In the established path judgment step in S110, the established path judgment means 342 judges whether bidirectional optical paths have been reserved or not. This judgment is performed depending on whether the reserve packet includes information on 1 set of a start point and end point, or includes information on 2 sets of a start point and end point. If the reserve packet includes 2 sets of information, bidirectional optical paths have been reserved, so the reserve completion packet is generated and sent to the management device in S112. If the reserve packet includes only 1 set of information, bidirectional optical paths have not been reserved, so new reserve packet is added to the reserve packet received in S115. If a plurality of reserve packets is received, new reserve packet is added to the reserve packet received first.

New reserve packet is added by the reserve packet addition means 336. The new reserve packet to be added includes information on the start point node ID, end point node ID, wavelength ID, transit node ID and reserve possibility judgment flag. A new start point ID and a new end point ID are the end point node ID and the start point node ID of the reserve packet before being added respectively. In other words, the start point and end point are reversed between the reserve packet before being added and the reserve packet to be added. The wavelength ID, transit node ID and reserve possibility judgment flag of the reserve packet are all "0". After the new reserve packet is added, the processing from S120 to S180 is executed in the same way as the processing in the start point node device described with reference to FIG. 11A.

After the reserve failure packet is generated in S190, the packet transmission means 334 sends the reserve failure packet to the management device directly or via the relay node device using an already established one-directional optical path in S197.

(Relay Node Device)

Figure 12C:
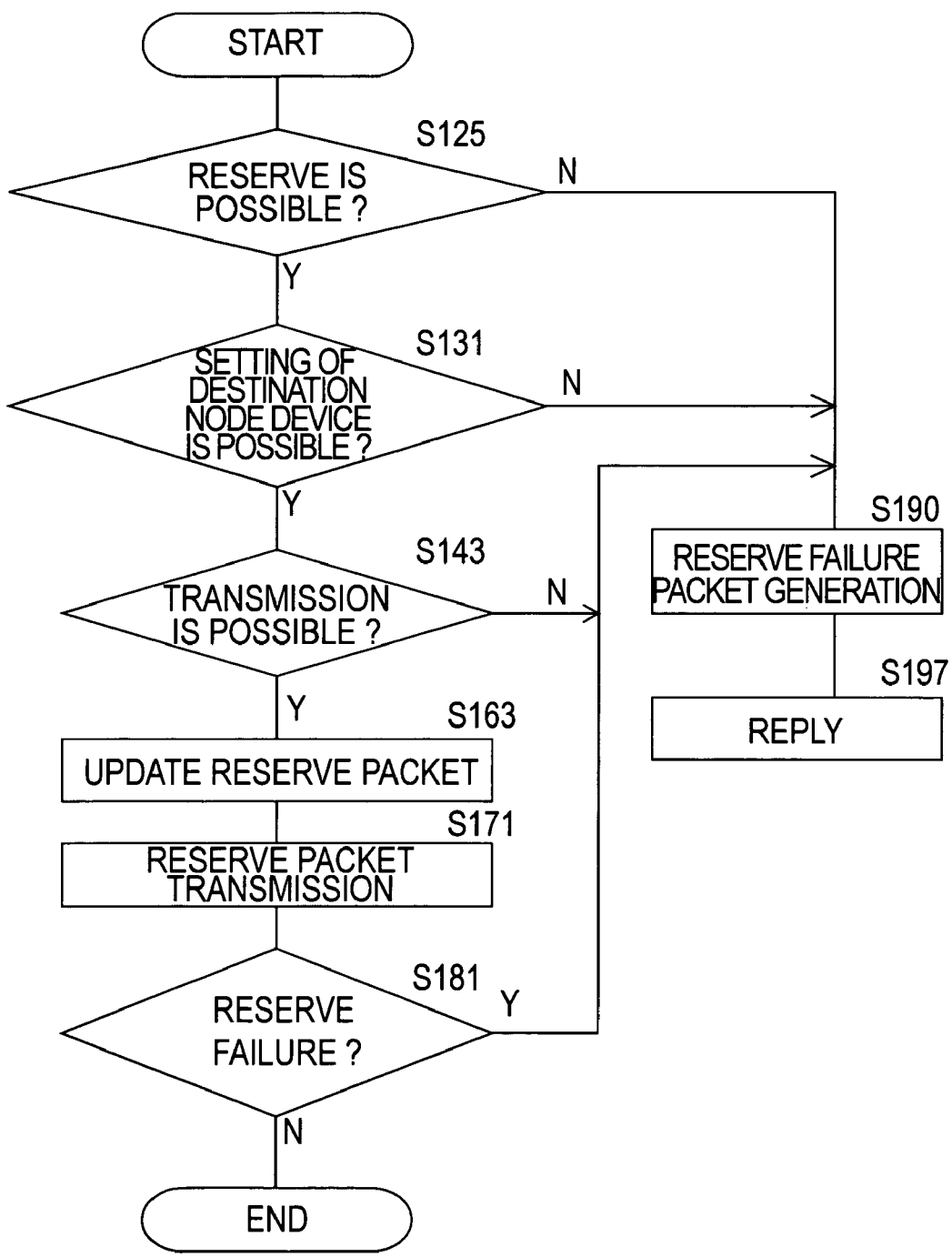
FIG. 12C shows the processing flow in the relay node device.
Figure 13:
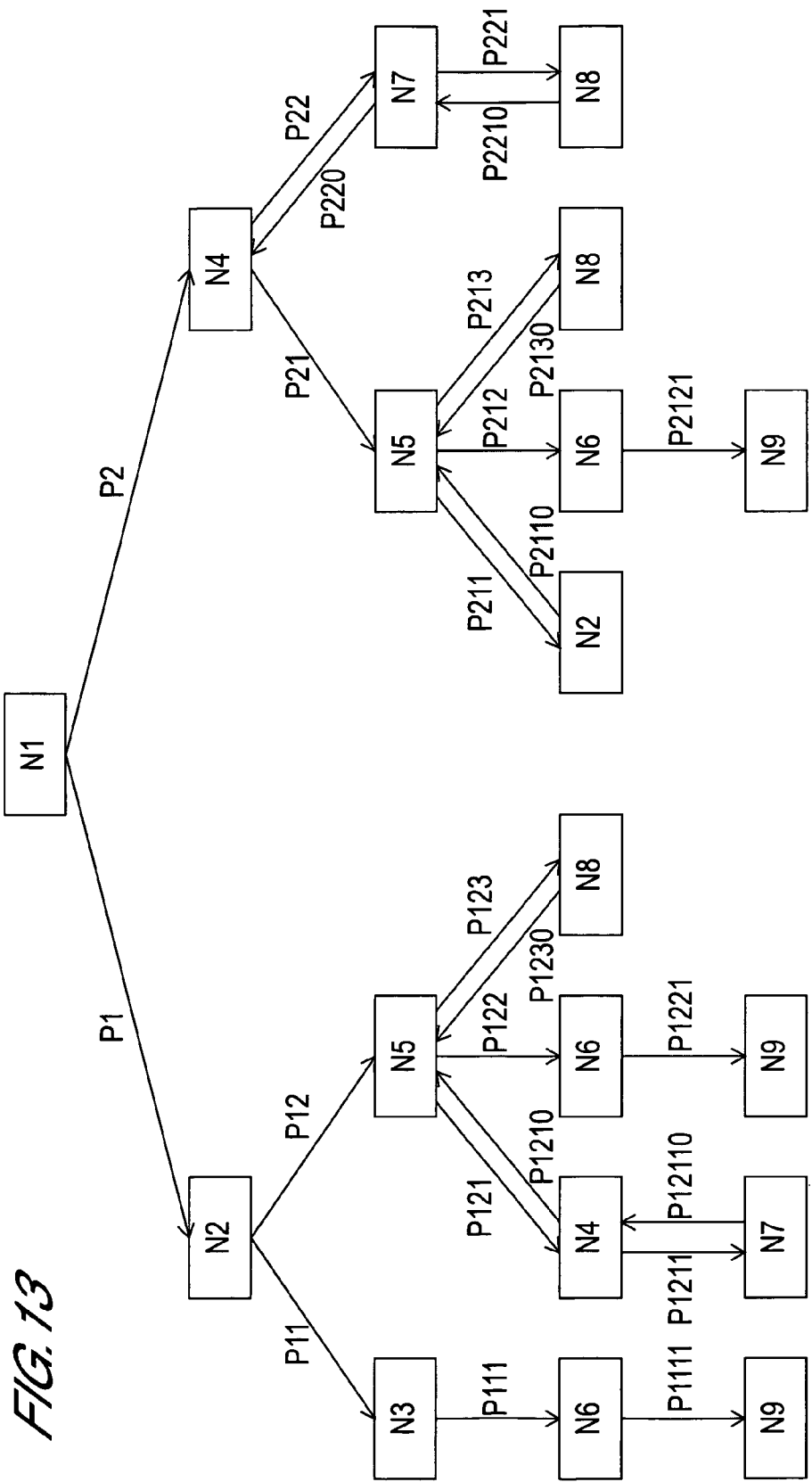
FIG. 13 is a diagram depicting the wavelength reserve method according to the second embodiment of the present invention.

Now the processing in the relay node device will be described with reference to FIG. 12C.

In the reserve possibility judgment step in S125, the reserve possibility judgment means 344 reads a specified value which has been recorded in the ROM 310 in advance, and compares it with a reserve possibility flag included in the reserve packet sent from the node device in the previous stage. If the reserve possibility flag is smaller than the specified value, the reserve possibility judgment means 344 judges it as reserve possible, and executes the processing in S131. If the reserve possibility flag is equal to the specified value, the reserve possibility judgment means 344 judges it as reserve impossible. And the processing in S190 is executed responding to the judgment of reserve impossible.

In S190, the reserve failure packet generation means 362 generates the reserve failure packet. The reserve failure packet is generated by updating the reserve packet ID assigned to the reserve packet, for example. After S190, the packet transmission means 334 replies the reserve failure packet to the transmission source node device of the reserve packet in S197.

Here the physical hop count is used as the reserve possibility flag. The maximum physical hop count, which is a specified value, is 3. In the optical communication network shown in FIG. 1, a loop of the optical path can be prevented by setting the maximum physical hop count to 3.

In the destination node setting step in S131, it is judged whether the setting of the destination node device is possible. In this judgment, the destination node setting means 348 refers to the cost matrix 312, and searches the adjacent node devices. Then the destination node setting means 348 registers the start point node device and transit node device among the adjacent nodes in the RAM as transmission impossible node devices. The destination node setting means 348 temporarily sets one or two or more transmission possible node devices excluding the transmission impossible node devices as destination node devices. After the temporary setting of the destination node devices, the process in S143 is executed. If there is not a node device that can be set for the destination node device, the processes in S190 and S197 are executed regarding it as reserve impossible.

In the transmission possibility judgment in S143, the transmission possibility judgment means 352 judges whether transmission is possible or not to the tentative destination node device. In this judgment, the transmission possibility judgment means 352 reads the link state table 322 from the RAM 320, then changes the transmission wavelength. The transmission wavelength is changed by removing wavelengths which are being used in the optical fiber connected to the destination node device from the transmission wavelengths. If there is no transmission wavelength as a result of changing the transmission wavelength, the tentative destination node device is regarded as transmission impossible, and is added to the transmission impossible node devices.

In the reserve packet update step in S163, the reserve packet update means 338 deletes the wavelengths in use from the transmission wavelengths of the reserve packet, and writes the self node ID in the column of the transit node device, and adds 1 to the numeric in the column of the reserve possibility judgment flag, so as to update the reserve packet.

In the reserve packet transmission step in S171, responding to the update of the reserve packet, the packet transmission means 334 reads the updated reserve packet from the RAM 320, and sends it to one or two or more tentative destination node devices. At this time, the reserve packet transmission count storage means 364 stores the reserve packet transmission count 326 in the RAM 320.

In S181, the reserve failure judgment means 366 judges whether a reserve failure occurred or not. If the packet receive means 332 does not receive the reserve failure packet, or if the reserve failure packet was received but the receive count is smaller than the transmission count of the reserve packet, the processing in the node device is ended regarding this as reserve possible. If the transmission count of the reserve packets which the packet receive means 332 transmitted and the receive count of the reserve failure packet are the same, the processes in S190 and S197 are executed regarding this as reserve impossible. If the reserve failure packet is not received, an optical path which relays the self node device is set, so the optical path setting signal is received when the path setting of the entire optical communication network completes. Therefore it can be judged whether the reserve failure packet was received or not depending on which one of the reserve failure packet and the optical path setting signal the packet receive means 332 received.

By the optical path setting device for setting an optical path in an optical communication network, an optical communication network comprising this optical path setting device, optical path reserve method and program thereof according to the second embodiment, an effect similar to the optical path setting device for setting an optical path in an optical communication network, the optical communication network comprising this optical path setting device, optical path reserve method and program thereof according to the first embodiment, can be implemented.

If there are two or more transmission possible node devices, all of them, are set to destination node devices, and the reserve packet is sent to them simultaneously, then path selection and wavelength selection can be performed for a plurality of paths in parallel, and time required for path setting can be further decreased.

SECOND EXAMPLE

An example of setting a new optical path in an optical communication network in which a plurality of optical paths are set will be described with reference to FIGS. 6, 8, 9, 11 to 13 and Tables 9 to 15.

An example of setting a new optical path between N1 and N9 in the optical path layout in the initial state shown in FIG. 8 will be described. The administrator inputs 2 node IDs using the input means of the management device 200. It is assumed that the node device of which node ID is smaller is set to be the start point node device, and the node device of which node ID is greater is set to the end point node device. Therefore in this example, N1 is the start point node device, and N9 is the end point node device. Responding to the input, the management device 200 generates the reserve packet. The reserve packet is sent from the transmission section to N1 via the control line.

In S10, N1 receives the reserve packet from the management device 200.

In S20, the node device judgment is executed, then the wavelength reserve processing in S100 is executed. Here N1 is the start point node device, so the processing described with reference to FIG. 12A is executed.

In S120, it is judged whether the transmission possible wavelength exists or not. Since N1 is transmitting with $\lambda 1$ and $\lambda 4$, $\lambda 2$ and $\lambda 3$ are transmission possible wavelengths.

In S131, it is judged whether the setting of the destination node device is possible or not. Referring to the cost matrix, the node device adjacent to N1 is N2 of which cost is 1, and N4 of which cost is 4. Here there is not a transmission impossible node device, so N2 and N4 are temporarily set as the destination node devices.

In S141, it is judged whether transmission possible wavelengths exist or not for the destination node device. In the link state table read from the RAM of N1, the transmission possible wavelengths to N2 are $\lambda 2$ and $\lambda 3$. The transmission possible wavelength to N4 is $\lambda 2$.

In S151, the transmission wavelength is temporarily set. Here the wavelengths that can be transmitted to N2 are $\lambda 2$ and $\lambda 3$, so $\lambda 2$ and $\lambda 3$ are temporarily set as the transmission wavelengths in the reserve packet where N2 is temporarily set as the destination node device. The wavelength that can be transmitted to N4 is $\lambda 2$, so $\lambda 2$ is temporarily set as the transmission wavelength in the reserve packet where N4 is temporarily set as the destination node device.

In S161, the reserve packet P1 to N2 shown in Table 9 and the reserve packet P2 to N4 shown in Table 10 are updated. The reserve packet update means 338 writes the transmission wavelength IDs 2 and 3 to the column of the wavelength ID of the reserve packet P1 and the transmission wavelength ID 2 to the column of the wavelength ID of the reserve packet P2. Since N1 is the start point node device, the columns of the transit node device and reserve possibility judgment flag are not updated.

TABLE 9

| START | END | WAVELENGTH | TRANSIT | FLAG |
|-------|-----|------------|---------|------|
| 1     | 9   | 2, 3       | 0       | 0    |

TABLE 10

| START | END | WAVELENGTH | TRANSIT | FLAG |
|-------|-----|------------|---------|------|
| 1     | 9   | 2          | 0       | 0    |

In S171, the packet transmission means 334 sends the updated reserve packets P1 and P2 to the tentative destination node device. The reserve packet P1 is sent to N2 which is a tentative destination node device, and the reserve packet P2 is sent to N4 which is a tentative destination node device.

In S10, N2 receives the reserve packet P1 from N1.

In S20, node device judgment is performed, and then the wavelength reserve processing in S100 is performed. Since N2 is a relay node device, the processing described with reference to FIG. 12C is executed.

In S125, the reserve possibility judgment means 344 judges whether reserve is possible or not. Here the reserve possibility flag is 0, and is smaller than the specified value 3, so it is judged that reserve is possible.

In S131, the destination node setting means 348 judges whether the destination node device can be set or not. Referring to the cost matrix, node devices adjacent to N2 are N1, N3 and N5. Here N1, which is the start point node device, is a transmission impossible node device, and N3 and N5, which are adjacent node devices after removing the transmission impossible node device, are temporarily set to the destination node devices.

In S143, the transmission possibility judgment means 352 judges whether transmission is possible or not to the destination node device. In the link state table (FIG. 9B) read from the RAM of N2, transmission is possible to N3 and N5 with λ2 and λ3.

In S162, the reserve packet update means 338 updates the reserve packet P1. The reserve packet update means 338 writes N2 in the column of the transit node device since N2 is the relay node device, and adds 1 to the numeric in the column of the reserve possibility judgment flag, which results in 1, so as to update the reserve packet, and acquires the reserve packets P11 and P12 shown in Table 11.

TABLE 11

| START | END | WAVELENGTH | TRANSIT | FLAG |
|---|---|---|---|---|
| 1 | 9 | 2, 3 | 2 | 1 |

In S171, the packet transmission means 334 sends the updated reserve packets P11 and P12 to the tentative destination node devices. The reserve packet P11 is sent to N3, and the reserve packet P12 is, sent to N5.

In S10, N3 receives the reserve packet P11 from N2.

In S20, the node device judgment is performed, and then the wavelength reserve processing in S100 is performed. Since N3 is a relay node device, the processing described with reference to FIG. 12C is executed.

In S125, it is judged whether reserve is possible or not. Here the reserve possibility flag is 1, and is smaller than the specified value 3, so it is judged that reserve is possible.

In S131, it is judged whether the destination node device can be set or not. Referring to the cost matrix, node devices adjacent to N3 are N2 and N6. Here N2, which is the transmission source node device, is a transmission impossible node device, and N6, which is an adjacent node device after removing the transmission impossible node device, is set to a destination node device.

In S143, it is judged whether transmission is possible or not to the tentative destination node device. In the link state table read from the RAM of N3, the fiber ID for transmission to N6 is 9, and wavelengths λ2 and λ4 are in use. Therefore transmission with λ2 is impossible. So λ3 is used for the transmission wavelength.

In S163, the reserve packet P11 is updated. The reserve packet update means writes N3 in the column of the transit node device with removing λ3 from the transmission wavelengths of the reserve packet P11, and adds 1 to the numeric in the column of the reserve possibility judgment flag, which results in 2, so as to update the reserve packet, and acquires the reserve packet P11 shown in Table 12.

TABLE 12

| START | END | WAVELENGTH | TRANSIT | FLAG |
|---|---|---|---|---|
| 1 | 9 | 3 | 2, 3 | 2 |

In S171, the packet transmission means 334 sends the updated reserve packet P111 to N6, which is the tentative destination node device.

In S10, N6 receives the reserve packet P111 from N3.

In S20, the node device judgment is performed, and then wavelength reserve processing in S100 is performed. Since N6 is a relay node device, the processing described with reference to FIG. 12C is executed.

In S125, it is judged whether reserve is possible or not. Here the reserve possibility flag is 2, and is smaller than the specified value 3, so it is judged that reserve is possible.

In S131, it is judged whether the destination node device can be set or not. Referring to the cost matrix, node devices adjacent to N6 are N2, N5 and N9. Here the end point node device is included in the adjacent node devices, so N9, which is the end point node devices, is temporarily set to the destination node device.

In S143, it is judged whether transmission is possible to the tentative destination node device. In the link state table read from the RAM of N6, the fiber ID for transmission to N9 is 19, and wavelengths λ1 and λ4 are in use. Therefore transmission with λ3 is possible.

In S163, the reserve packet P111 is updated. The reserve packet update means 338 writes N6 to the column of the transit node device of the reserve packet P111, and adds 1 to the numeric in the column of the reserve possibility judgment flag, which results in 3, so as to update the reserve packet, and acquires the reserve packet P1111 shown in Table 13.

TABLE 13

| START | END | WAVELENGTH | TRANSIT | FLAG |
|---|---|---|---|---|
| 1 | 9 | 3 | 2, 3, 6 | 3 |

In S171, the packet transmission means 334 sends the updated reserve packet P1111 to N9, which is the tentative destination node device.

Processing in N9 will be described later.

In S10, N5 receives the reserve packet P12 which was sent from N2 simultaneously with the above mentioned reserve packet P11.

In S20, the node judgment means 320 performs node device judgment, and then wavelength reserve processing in S100 is performed. Since N5 is a relay node device, the processing described with reference to FIG. 12C is executed.

In S125, the reserve possibility judgment means 344 judges whether reserve is possible. Here the reserve possibility flag is 1, and is smaller than the specified value 3, so it is judged that reserve is possible.

In S131, the destination node setting means 348 judges whether the destination node device can be set or not. Referring to the cost matrix, node devices adjacent to N5 are N2, N4, N6 and N8. Therefore the destination node setting means 348 regards the transmission source node device N2 as a transmission impossible node device, and sets N4, N6 and N8, which are adjacent node devices after excluding the transmission impossible node device, as the destination node devices.

In S143, the transmission possibility judgment means 352 judges whether transmission is possible or not to the tentative destination node device. In the link state table (FIG. 9E) read from the RAM of N5, the fiber ID for transmission to N4 is 12, and λ4 is in use and the fiber ID for transmission to N6 is 13, and λ1 and λ4 are in use. The fiber ID for transmission to N8 is 17, and λ1 is in use. Therefore transmission is possible to any of the node devices with λ2 and λ3.

In S163, the reserve packet update means 338 updates the reserve packet P12. The reserve packet update means 338 writes N5 in the column of the transit node device of the reserve packet P12, and adds 1 to the numeric in the column of the reserve possibility judgment flag, which results in 2, so as to update the reserve packet, and acquires the receive packets P121, P122 and P123 shown in Table 14.

TABLE 14

| START | END | WAVELENGTH | TRANSIT | FLAG |
|-------|-----|------------|---------|------|
| 1 | 9 | 2, 3 | 2, 5 | 2 |

In S171, the packet transmission means 334 sends the updated packets P121, P122 and P123 to the tentative destination node devices. The reserve packet P121 is sent to N4, the reserve packet P122 is sent to N6, and the reserve packet P123 is sent to N8.

In S10, N4 receives the reserve packet P121 from N5.

In S20, the node judgment means 340 performs the node device judgment, and then the wavelength reserve processing in S100 is performed. Since N4 is a relay node device, the processing described with reference to FIG. 12C is executed.

In S125, the reserve possibility judgment means 344 judges whether reserve is possible or not. Here the reserve possibility flag is 2, and is smaller than the specified value 3, so it is judged that reserve is possible.

In S131, the destination node setting means 348 judges whether the destination node device can be set or not. Referring to the cost matrix, node devices adjacent to N4 are N1, N5 and N7. Therefore the destination node setting means 348 regards N1 and N5, which are the start point node device and transit node device, as transmission impossible node devices, and temporarily sets N7, which is an adjacent node device after removing the transmission impossible node devices, as the destination node device.

In S143, the transmission possibility judgment means 352 judges whether transmission is possible or not to N7, which is the tentative destination node device. In the link state table read from the RAM of N4 (FIG. 9D), the fiber ID for transmission to N7 is 15, and $\lambda 4$ is in use. Therefore transmission is possible with $\lambda 2$ and $\lambda 3$.

In S163, the reserve packet update means 338 updates the reserve packet P121. The reserve packet update means writes N4 in the column of the transit node device of the reserve packet P121, and adds 2 to the numeric in the column of the reserve possibility judgment flag, which results in 3.

In S171, the packet transmission means 334 sends the updated reserve packet P1211 to N7, which is the destination node device.

In S10, N7 receives the reserve packet from N4.

In S20, the node judgment means 340 performs node device judgment, and then the wavelength reserve processing in S100 is performed. Since N7 is a relay node device, the processing described with reference to FIG. 12C is executed.

In S125, the reserve possibility judgment means 344 judges whether reserve is possible or not. Here the reserve possibility flag is 3, and is the specified value 3 or more, so it is judged that reserve is impossible.

In S190, the reserve failure packet generation means 362 generates a reserve failure packet. Then in S197, the reserve failure packet P12110 is replied to N4, which is the transmission source node device of the reserve packet P1211.

N4, which received the reserve failure packet 12110, judges that reserve is impossible since the transmission count of the reserve packet is 1, and the receive count of the reserve failure packet is 1.

After generating the reserve failure packet P1210 in S190, N4 replies the reserve failure packet P1210 to N5, which is the transmission source node device of the reserve packet P121 in S197.

In S10, N6 receives the reserve packet P122 which was sent from N5 simultaneously with the above mentioned reserve packet P121.

In S20, the node judgment means 340 performs node device judgment, and then the wavelength reserve processing in S100 is performed. Since N6 is a relay node device, the processing described with reference to FIG. 12C is executed.

In S125, the reserve possibility judgment means 344 judges whether reserve is possible. Here the reserve possibility flag is 2, and is smaller than the specified value 3, so it is judged that reserve is possible.

In S131, the destination node setting means 348 judges whether the destination node device can be set or not. Referring to the cost matrix, node devices adjacent to N6 are N2, N5 and N9. Since the end point node is included in the adjacent node devices, the destination node setting means 348 temporarily sets N9, which is the end point node device, as the destination node device.

In S143, the transmission possibility judgment means 352 judges whether transmission is possible or not to the destination node device. In the link state table read from the RAM of N6, the fiber ID for transmission to N9 is 19, and wavelengths $\lambda 1$ and $\lambda 4$ are in use. Therefore transmission is possible with $\lambda 2$ and $\lambda 3$.

In S163, the reserve packet is updated. The reserve packet update means 338 writes N6 in the column of the transit node device of the reserve packet P122, and adds 1 to the numeric in the column of the reserve possibility judgment flag, which results in 3, so as to update the reserve packet, and acquires the reserve packet P1221 shown in Table 15.

TABLE 15

| START | END | WAVELENGTH | TRANSIT | FLAG |
|-------|-----|------------|---------|------|
| 1 | 9 | 2, 3 | 2, 5, 6 | 3 |

In S171, the packet transmission means 334 sends the updated reserve packet P1221 to N9, which is the tentative destination node device.

In S10, N8 receives the reserve packet P123 which was sent from N5 simultaneously with the above mentioned reserve packets P121 and P122.

In S20, the node judgment means 340 performs node device judgment, and then the wavelength reserve processing in S100 is performed. Since N8 is a relay node device, the processing described with reference to FIG. 12C is executed.

In S125, the reserve possibility judgment means 344 judges whether reserve is possible or not. Here the reserve possibility flag is 2, and is smaller than the specified value 3, so it is judged that reserve is possible.

In S131, the destination node setting means 348 judges whether the destination node device can be set or not. Referring to the cost matrix, node devices adjacent to N8 are N5, N7 and N9. Since the end point node device is included in the adjacent node devices, the destination node setting means 348 temporarily sets N9, which is the end point node device, to the destination node device.

In S143, the transmission possibility judgment means 352 judges whether transmission is possible or not to the tentative destination node device. In the link state table read from the RAM of N6, the fiber ID for transmission to N9 is 23, and wavelengths $\lambda 2$ and $\lambda 3$ are in use. Therefore transmission with $\lambda 2$ and $\lambda 3$ is impossible. So it is judged that reserve is impossible.

In S190, the reserve failure packet P1230 is generated, then in S197, the reserve failure packet P1230 is replied to N5, which is the transmission source node device of the reserve packet P123.

N5, which transmitted 3 reserve packets, P121, P122 and P123, has a reserve packet transmission count 3. N5, which received 2 reserve failure packets P1210 and P1230, has a reserve failure packet receive count 2. Therefore N5 judges that reserve is possible.

Similar processing is also performed in N4, which received the reserve packet P2 from N1, and the reserve packet P2121 is sent from N1 to N9 via N4, N5 and N6.

In S10, N9 receives the reserve packets P1111, P1211 and P2121 from N6 respectively.

In S20, the node device judgment is performed, and then the wavelength reserve processing in S100 is performed. Here N9 is the end point node device, so the processing described with reference to FIG. 12B is executed.

In S110, it is judged whether bidirectional paths have been set. Here bidirectional paths have not been set, so a new reserve packet is added to the reserve packet received in S112. In this case, one of the reserve packets P1111, P1221 and P2121, received by N9 first, is used.

The start point node ID and end point node ID of the reserve packet to be added are the end point node ID 9 and the start point node ID 1 of the reserve packet before being added respectively. It is assumed that the wavelength ID, transit node ID and reserve possibility judgment flag of the reserve packet are all "0". After the reserve packet is added, the above mentioned processing is repeatedly executed for the added reserve packet.

What is claimed is:

1. A node device, in an optical communication network, which comprises a plurality of node devices including a start point node device, a relay node device and an end point node device, optical fibers connecting adjacent node devices for transmitting wavelength multiplexed signals, and a management device connected to each of said plurality of node devices for generating reserve packets, and in which an optical path is set from said start point node device to said end point node device via said relay node device, wherein when said node device is referred to as a self node device, said self node device comprises an input section, an optical path switching section, an output section and a control section;

wherein said input section demultiplexes input wavelength multiplexed signals which are input from an adjacent node device, which is adjacent to said self node device, into each wavelength so as to generate a plurality of single wavelength signals, and sends each of said single wavelength signals to said optical path switching section;

wherein responding to an optical path switching signal received from said control section, said optical path switching section switches an optical path to a destination node device, which is said adjacent node device, for each of said single wavelength signals, and sends each of signal wavelength signals to said output section;

wherein said output section multiplexes each of said single wavelength signals which have been sent from said optical path switching section to a common destination node device so as to generate an output wavelength multiplexed signal, and sends said output wavelength multiplexed signal to said common destination node device; and wherein said control section comprises:

a storage section for recording a cost matrix which indicates a transmission cost between said self node device and each adjacent node device, and for recording a link state table which indicates an optical fiber between said self node device and each adjacent node device, whether transmission is being performed or not in said optical fiber, and a wavelength being used for transmission;

packet receive means for receiving a reserve packet including information on said start point node device, said end point node device, transmission wavelength, and said transit node device, or a reserve failure packet, from an adjacent node device, to be stored in said storage section;

destination node setting means for referring to the information of said cost matrix and said stored reserve packet, when judging said start point node device, said transit node device, and a transmission source node device of said reserve failure packet, out of said adjacent node devices, as transmission impossible node devices and judging the rest as transmission possible node devices, then storing a transmission possible node device of which said transmission cost is lowest in said storage section as a tentative destination node device;

transmission possibility judgment means for referring to said link state table on an optical fiber connected to said tentative destination node device, judging the same as transmission possible if the transmission wavelength of said reserve packet is not in use, and as transmission impossible if the transmission wavelength of said reserve packet is in use, and updating said tentative destination node device stored in said storage section to a transmission impossible node device;

reserve packet update means for adding information on said self node device to the information on a transit node device of said reserve packet stored in said storage section so as to update said reserve packet in response to said judgment as transmission possible;

reserve failure packet generation means for generating a new reserve failure packet which is different from said reserve failure packet if said transmission possible node device does not exist in the judgment by said destination node setting means;

packet transmission means for reading said updated reserve packet from said storage section and sending the same to said tentative destination node device if said updated reserve packet exists, or sending a new reserve failure packet to said reserve packet transmission source if said new reserve failure packet is generated; and switching signal generation means for generating said optical path switching signal in response to reception of an optical path setting signal generated by said management device and sending said optical path switching signal to said optical path switching section.

2. A node device, in an optical communication network, which comprises a plurality of node devices including a start point node device, a relay node device, and an end point node device, optical fibers connecting adjacent node devices for transmitting wavelength multiplexed signals, and a management device connected to each of said plurality of node devices for generating reserve packets, and in which an optical path is set from said start point node device to said end point node device via said relay node device, wherein when said node device is referred to as a self node device, said self node device comprises an input section, an optical path switching section, an output section, a relay section and a control section;

wherein said input section demultiplexes input wavelength multiplexed signals which are input from an adjacent node device, which is adjacent to said self node device, into each wavelength so as to generate a plurality of single wavelength signals, and sends each of said single wavelength signals to said optical path switching section;

wherein in response to a termination switching signal received from said control section, said optical path switching section switches the state to one of two states, that are a termination state in which said plurality of single wavelength signals are sent to said relay section and a single wavelength signal out of said plurality of single wavelength signals or a single wavelength signal different from said plurality of single wavelength signals is received from said relay section, and a cut-through state in which said plurality of single wavelength signals are not relayed by said relay section, and in response to an optical path switching signal received from said control section, said optical path switching section switches an optical path to a destination node device, which is an adjacent node device, for each of single wavelength signals out of said plurality of single wavelength signals or said different single wavelength signal, and sends the single wavelength signal to said output section;

wherein said output section multiplexes each of said single wavelength signals which have been sent from said optical path switching section to a common destination node device so as to generate an output wavelength multiplexed signal, and sends said output wavelength multiplexed signal to said common destination node device;

wherein said relay section comprises a router and conversion devices which are installed one-to-one with two or more interfaces of said router for converting said plurality of single wavelength signals received from said optical path switching section into electric signals, and sending the signals to said router, and converting electric signals received from said router into single wavelength signals having mutually different wavelengths corresponding to a plurality of wavelengths of said input wavelength multiplexed signals respectively; and wherein said control section comprises:

a storage section for recording a cost matrix which indicates a transmission cost between said self node device and each adjacent node device, and an optical path state table for indicating said setting state of said optical path switching section and the switching state of said optical path, and for recording a link state table which indicates an optical fiber between said self node device and each adjacent node device, whether transmission is being performed or not in said optical fiber, and a wavelength being used for transmission;

packet receive means for receiving a reserve packet including information on said start point node device, said end point node device, transmission wavelength and said transit node device from said adjacent node device or said management device, or receiving a reserve failure packet from said adjacent node device, and storing the same in said storage section;

node judgment means for judging whether said self node device is said start point node device, said end point node device, or said relay node device in response to storing of said reserve packet;

destination node setting means for referring to information on said cost matrix and said stored reserve packet, when judging said start point node device, said transit node device and a transmission source node device of said reserve failure packet, out of said adjacent node devices, as transmission impossible node devices and judging the rest as transmission possible node devices, then storing a transmission possible node device of which said transmission cost is lowest in said storage section as a tentative destination node device;

transmission possible wavelength acquisition means for referring to said optical path state table and acquiring a transmission possible wavelength in response to storing of said tentative destination node device, if said self node device is said start point node device as a result of judgment by said node judgment means;

transmission wavelength setting means for referring to said link state table and temporarily setting one of wavelengths not being used in an optical fiber connected to said tentative destination node device out of said transmission possible wavelengths if said self node device is said start point node device, or for updating said tentative destination node device stored in said storage section to a transmission impossible node device if all of said transmission possible wavelengths are used for the optical fiber connected to said tentative destination node device;

transmission possibility judgment means for referring to said link state table on an optical fiber connected to said tentative destination node device if said self node device is said relay node device, and judging the same as transmission possible if the transmission wavelength of said reserve packet is not in use, and as transmission impossible if the transmission wavelength of said reserve packet is in use, and updating said tentative destination node device stored in said storage section to a transmission impossible node device;

reserve packet update means for adding information on said temporarily set transmission wavelength to information on the transmission wavelength of said reserve packet stored in said storage section so as to update said reserve packet in response to temporary setting of said transmission wavelength, if said self node device is said start point node device, or adding information on said relay node device to the information on a transit node device of said reserve packet stored in said storage section so as to update said reserve packet in response to the judgment of said transmission possible, if said self node device is said relay node device;

reserve failure packet generation means for generating a new reserve failure packet which is different from said reserve failure packet if said transmission possible node device does not exist in the judgment by said destination node setting means;

reserve completion packet generation means for generating a reserve completion packet if said self node device is said end point node device as a result of the judgment by said node judgment means;

packet transmission means for reading said updated reserve packet from said storage section and sending the same to said tentative destination node device if said updated reserve packet exists, and sending said reserve completion packet to said management device if said reserve completion packet is generated, or sending a new reserve failure packet to said reserve packet transmission source if said new reserve failure packet is generated; and switching signal generation means for generating said termination switching signal and said optical path switching signal in response to reception of an optical path setting signal generated by said management device, and sending said termination switching signal and said optical path switching signal to said optical path switching section.

3. The node device according to claim 2, wherein said control section further comprises:
established path judgment means for judging whether bidirectional optical paths are reserved between a start point node device and an end point node device if the self node device is an end point node device as a result of judgment by said node judgment means; and
reserve packet addition means for setting an end point node device and a start point node device included in a reserve packet stored in said storage section to a new start point node device and a new end point node device respectively, and adding said new start point node device and new end point node device to the reserve packet if bidirectional optical paths are not set as a result of judgment by said established path judgment means.

4. An optical communication network comprising a plurality of node devices, optical fibers connecting adjacent node devices for transmitting wavelength multiplexed signals, and a management device connected to each of said plurality of node devices, wherein
the node device according to claim 2 is used as said node device.

5. A node device, in an optical communication network, which comprises a plurality of node devices including a start point node device, a relay node device, and an end point node device, optical fibers connecting adjacent node devices for transmitting wavelength multiplexed signals, and a management device connected to each of said plurality of node devices for generating reserve packets, and in which an optical path is set from said start point node device to said end point node device via said relay node device,
wherein when said node device is referred to as a self node device, said self node device comprises an input section, an optical path switching section, an output section and a control section;
wherein said input section demultiplexes input wavelength multiplexed signals which are input from an adjacent node device, which is adjacent to said self node device, into each wavelength so as to generate a plurality of single wavelength signals, and sends each of said single wavelength signals to said optical path switching section;
wherein responding to an optical path switching signal received from said control section, said optical path switching section switches an optical path to a destination node device which is said adjacent node device for each of said single wavelength signals and sends each of single wavelength signals to said output section;
wherein said output section multiplexes each of said single wavelength signals which have been sent from said optical path switching section to a common destination node device so as to generate an output wavelength multiplexed signal, and sends said output wavelength multiplexed signal to said common destination node device; and
wherein said control section comprises:
a storage section for recording a cost matrix which indicates a transmission cost between said self node device and each adjacent node device, and for recording a link state table which indicates an optical fiber between said self node device and each adjacent node device, whether transmission is being performed or not in said optical fiber, and a wavelength being used for transmission;
packet receive means for receiving a reserve packet including information on said start point node device, said end point node device, transmission wavelength, and said transit node device, or a reserve failure packet, from said adjacent node device, to be stored in said storage section;
destination node setting means for referring to the information on said stored reserve packet, when judging the start point node device and transit node device out of the adjacent node devices as transmission impossible node devices and judging the rest as transmission possible node devices, then storing one or two or more transmission possible node devices in said storage section as tentative destination node devices;
transmission wavelength change means for referring to said link state table for an optical fiber connected to each of said tentative destination node devices, and removing wavelengths in use in said optical fiber from the transmission wavelengths of said reserve packet so as to change the transmission wavelength of said reserve packet, and judging that transmission is impossible to a tentative destination node device of which all the transmission wavelengths of said reserve packet are in use, and updating the state of said tentative node device to a transmission impossible node device;
reserve packet update means for adding information on said self node device to the information on a transit node device of said reserve packet stored in said storage section so as to update said reserve packet in response to the change of said transmission wavelength;
reserve failure packet generation means for generating a reserve failure packet if a transmission possible node device does not exist in the judgment by said destination node setting means, or if the transmission wavelengths are used in the optical fibers connected to all the tentative destination node devices;
packet transmission means for reading said updated reserve packet from said storage section and sending the same to said tentative destination node device if said updated reserve packet exists, or sending a new reserve failure packet to said reserve packet transmission source if said new reserve failure packet is generated;
transmission count storage means for readably storing the transmission count of said updated reserve packet in said storage section;
reserve failure judgment means for comparing the receive count of said reserve failure packets with said transmission count read from said storage section, and judging that a transmission possible node device does not exist if said receive count is the same as said transmission count; and
switching signal generation means for generating said optical path switching signal in response to reception of a path setting signal generated by said management device, and sending said optical path switching signal to said optical path switching section.

6. A node device, in an optical communication network, which comprises a plurality of node devices including a start point node device, a relay node device, and an end point node device, optical fibers connecting adjacent node devices for transmitting wavelength multiplexed signal, and a management device connected to each of said plurality of node devices for generating reserve packets, and in which an optical path is set from said start point node device to said end point node device via said relay node device,
wherein when said node device is referred to as a self node device, said self node device comprises an input section, an optical path switching section, an output section, a relay section and a control section;

wherein said input section demultiplexes input wavelength multiplexed signals which are input from an adjacent node device, which is adjacent to said self node device, into each wavelength so as to generate a plurality of single wavelength signals, and sends each of said single wavelength signals to said optical path switching section;

wherein in response to a termination switching signal received from said control section, said optical path switching section switches to one of two states, that are a termination state in which said plurality of single wavelength signals are sent to said relay section and one single wavelength signal out of said plurality of single wavelength signals or a single wavelength signal different from said plurality of single wavelength signals is received from said relay section, and a cut-through state in which said plurality of single wavelength signals are not relayed by said relay section, and in response to an optical path switching signal received from said control section, said optical path switching section switches an optical path to a destination node device, which is adjacent to said self node device, for each of single wavelength signals out of said plurality of single wavelength signals or said different single wavelength signal, and sends the single wavelength signal to said output section;

wherein said output section multiplexes each of said single wavelength signals which have been sent from said optical path switching section to a common destination node device, and generates an output wavelength multiplexed signal, and sends said output wavelength multiplexed signal to said common destination node device;

wherein said relay section comprises a router and conversion devices which are installed one-to-one with two or more interfaces of said router for converting said plurality of single wavelength signals received from said optical path switching section into electric signals, and sending the same to said router, and converting electric signals received from said router into single wavelength signals having mutually different wavelengths corresponding to a plurality of wavelengths of said input wavelength multiplexed signal respectively; and wherein said control section comprises:

a storage section for recording a cost matrix which indicates a transmission cost between said self node device and each adjacent node device, and an optical path slate table for indicating said setting state of said optical path switching section and the switching state of said optical path, and for recording a link state table which indicates an optical fiber between said self node device and each adjacent node device, whether transmission is being performed or not in said optical fiber, and a wavelength being used for transmission;

packet receive means for receiving a reserve packet including information on said start point node device, said end point node device, transmission wavelength, and said transit node device from said adjacent node device or said management device, or receiving a reserve failure packet from said adjacent node device, and storing the same in said storage section;

node judgment means for judging whether said self node device is said start point node device, said end point node device, or said relay node device in response to storing of said reserve packet;

destination node setting means for referring to the information of said cost matrix and said stored reserve packet, when judging said start point node device and said transit node device out of said adjacent node devices as transmission impossible node devices and judging the rest as transmission possible node devices, then storing one or two or more transmission possible node devices in said storage section as tentative destination node devices;

transmission possible wavelength acquisition means for referring to said optical path state table and acquiring a transmission possible wavelength in response to storing of said tentative destination node device, if said self node device is said start point node device as a result of judgment by said node judgment means;

transmission wavelength setting means for referring to said link state table and temporarily setting one or two or more wavelengths not being used in an optical fiber connected to said tentative destination node device out of said transmission possible wavelengths if said self node device is said start point node device, or for updating said tentative destination node device stored in said storage section to a transmission impossible node device if all of said transmission possible wavelengths are used for the optical fiber connected to said tentative destination node device;

transmission wavelength change means for referring to said link state table for an optical fiber connected to each of said tentative destination node devices and removing wavelengths in use in the optical fiber connected to said tentative destination node device from the transmission wavelengths of said reserve packet so as to change the transmission wavelength if said self node device is said relay node device, and judging that transmission is impossible to a tentative destination node device of which all the transmission wavelengths of said reserve packet are in use, and updating said tentative destination node device to a transmission impossible node device;

reserve packet update means for adding information on said temporarily set transmission wavelength to the information on said reserve packet stored in said storage section so as to update said reserve packet in response to the temporary setting of said transmission wavelength if said self node device is said start point node device, or for updating said reserve packet stored in said storage section in response to the change of said transmission wavelength if said self node device is said relay node device;

reserve failure packet generation means for generating a reserve failure packet if a transmission possible node device does not exist in the judgment by said destination node setting means, or the transmission wavelength is used in the optical fibers connected to all the destination node devices;

reserve completion packet generation means for generating a reserve completion packet if said self node device is said end point node device;

packet transmission means for reading said updated reserve packet from said storage section and sending the same to said tentative destination node device if said updated reserve packet exists, sending said reserve completion packet to said management device if said reserve completion packet is generated, or sending said reserve failure packet to said reserve packet transmission source if said reserve failure packet is generated;

transmission count storage means for readably storing the transmission count of said updated reserve packet in said storage section;

reserve failure judgment means for comparing the receive count of said reserve failure packets with said transmission count read from said storage section, and judging that a transmission possible node does not exist if said receive count is the same as said transmission count; and switching signal generation means for generating said termination switching signal and said optical path switching signal responding to the reception of a path setting signal generated by said management device, and sending said termination switching signal and said optical path switching signal to said optical path switching section.

7. An optical path reserve method executed in a relay node device when an optical path is set from a start point node device to an end point node device via said relay node device in an optical communication network which comprises a plurality of node devices including said start point node device, relay node device and end point node device, optical fibers connecting adjacent node devices for transmitting wavelength multiplexed signals, and a management device connected to each of said plurality of node devices, comprising the steps of:

receiving a reserve packet including information on said start point node device, said end point node device, transmission wavelength and a transit node device, from an adjacent node device which is adjacent to said relay node device, to be stored in a storage section of said relay node device;

referring to a cost matrix which has been stored in said storage section in advance and which indicates a transmission cost between said relay node device and each node device adjacent to said relay node device, when judging said start point node device and said transit node device out of the node devices adjacent to said relay node device as transmission impossible node devices and judging the rest as transmission possible node devices, then storing a transmission possible node device of which said transmission cost is lowest in said storage section as a tentative destination node device;

referring to a link state table which has been stored in said storage section in advance, and which indicates an optical fiber between said relay node device and said adjacent node device, whether transmission is being performed or not in said optical fiber, and a wavelength being used for transmission;

judging an optical fiber connected to said tentative destination node device as transmission possible if the transmission wavelength of said reserve packet is not in use, and as transmission impossible if the transmission wavelength of said reserve packet is in use;

updating said tentative destination node device stored in said storage section to a transmission impossible node device;

adding information on said relay node device to the information on the transit node device of said reserve packet stored in said storage section so as to update said reserve packet in response to judgment of transmission possible;

reading said updated reserve packet from said storage section; and sending the same to said tentative destination node device if said updated reserve packet exists, wherein if a reserve failure packet is received from said tentative destination node device, said tentative destination node device is judged as a transmission impossible node device to execute temporarily setting of said destination node device, a step of judging whether transmission is possible or not, updating a reserve packet, and sending said reserve packet; and wherein if a transmission possible node device does not exist, a new reserve failure packet which is different from said reserve failure packet is generated, and sent to the transmission source of said reserve packet.

8. A computer-readable medium, comprising software which executes the method according to claim 7.

9. An optical path reserve method executed in a start point node device when an optical path is set from said start point node device to an end point node device via a relay node device in an optical communication network which comprises a plurality of node devices including said start point node device, relay node device and end point node device, optical fibers connecting adjacent node devices for transmitting wavelength multiplexed signals, and a management device connected to each of said plurality of node devices, comprising the steps of:

receiving a reserve packet including information on said start point node device, said end point node device, transmission wavelength and a transit node device, from said management device, to be stored in a storage section of said start point node device;

referring to an optical path state table which has been stored in said storage section in advance, and which indicates a setting state of an optical path switching section;

acquiring a transmission possible wavelength;

referring to a cost matrix which has been stored in said storage section in advance, and which indicates a transmission cost between said start point node device and each adjacent node device which is adjacent to said start point node device;

temporarily setting a transmission possible node device of which transmission cost is lowest as destination node device when said adjacent node device is a transmission possible node device;

referring to a link state table which has been stored in said storage section in advance, and which indicates an optical fiber between said start point node device and each adjacent node device, whether transmission is being performed or not in said optical fiber, and a wavelength being used for transmission;

temporarily setting one of wavelengths which are not used in an optical fiber connected with said tentative destination node device as a transmission wavelength;

adding information on said temporarily set transmission wavelength to the information on transmission wavelength of said reserve packet stored in said storage section so as to update the reserve packet in response to temporary setting of said transmission wavelength ; and reading the updated reserve packet from said storage section and sending the same to said tentative destination node device if said updated reserve packet exists, wherein if a reserve failure packet is received from said tentative destination node device, said tentative destination node device is judged as a transmission impossible device to execute temporarily setting of said destination node device, temporarily setting of said transmission wavelength, updating of said reserve packet, and sending of said reserve packet; and wherein if a transmission possible wavelength does not exist, or if a transmission possible node device does not exist, a new reserve failure packet which is different from said reserve failure packet is generated, and sent to said management device.

10. A computer-readable medium, comprising software which executes the method according to claim 9.

11. An optical path reserve method executed in an end point node device when an optical path is set from a start point node device to said end point node device via a relay node device in an optical communication network which comprises a plurality of node devices including said start point node device, relay node device and end point node device, optical fibers connecting adjacent node devices for transmitting wavelength multiplexed signals, and a management device connected to each of said plurality of node devices, comprising the steps of:

receiving a reserve packet including information on said start point node device, said end point node device, transmission wavelength and a transit node device, from said adjacent node device which is adjacent to said end point node device, to be stored in a storage section of said end point node device; and judging whether bidirectional optical paths are reserved between said start point node device and said end point node device, wherein if said bidirectional optical paths are reserved, a reserve completion packet is generated and said reserve completion packet is sent to said management device, if said bidirectional optical paths are not reserved, said optical path reserve method further comprises the steps of:

setting an end point node device and a start point node device included in said reserve packet to a new start point node device and a new end point node device respectively to be added to the reserve packet;

referring to an optical path state table which has been stored in the storage section of said end point node device in advance, and which indicates a setting state of an optical path switching section and acquiring a transmission possible wavelength;

referring to a cost matrix which has been stored in said storage section in advance and which indicates a transmission cost between said end point node device which is said new start point node device and each adjacent node device;

temporarily setting a transmission possible node device of which transmission cost is lowest as a destination node device when said adjacent node device is a transmission possible node device;

referring to a link state table which has been stored in said storage section in advance, and which indicates a wavelength used for an optical fiber which performs transmission to said adjacent node device;

temporarily setting one of wavelengths which is a transmission possible wavelength and is not used for an optical fiber connected with said tentative destination node device as transmission wavelength;

adding information on said temporarily set transmission wavelength to the information on the transmission wavelength of said reserve packet stored in said storage section so as to update said reserve packet in response to the temporary setting of said transmission wavelength; and reading said updated reserve packet from said storage section and sending the same to said tentative destination node device if said updated reserve packet exists, wherein if a reserve failure packet is received from said tentative destination node device, said tentative transmissions destination node device is judged as a transmission impossible node device, to execute temporarily setting of said destination node device, temporarily setting of said transmission wavelength, updating of said reserve packet, and sending of said reserve packet; and wherein if a transmission possible node device does not exist, a new reserve failure packet which is different from said reserve failure packet is generated, 12. A computer-readable medium, comprising software which executes the method according to claim 11.

13. An optical path reserve method executed in a relay node device when an optical path is set from a start point node device to an end point node device via said relay node device in an optical communication network which comprises a plurality of node devices including said start point node device, relay node device and end point node device, optical fibers connecting adjacent node devices for transmitting wavelength multiplexed signals, and a management device connected to each of said plurality of node devices, comprising the steps of:

receiving a reserve packet including information on said start point node device, said end point node device, transmission wavelength and a transit node device, from an adjacent node device which is adjacent to said relay node device, to be stored in a storage section of said relay node device;

referring to a cost matrix which has been stored in said storage section in advance and which indicates a transmission cost between said relay node device and each node device adjacent to said relay node device;

storing one or two or more transmission possible node devices in said storage section as tentative destination node devices when judging said start point node device and transit node device out of the adjacent node devices as transmission impossible node devices and judging the rest as transmission possible node devices;

referring to a link state table which has been stored in said storage section in advance, and which indicates an optical fiber between said relay node device and said adjacent node device, whether transmission is being performed or not in said optical fiber, and a wavelength being used for transmission;

changing the transmission wavelength by removing the wavelength being used for an optical fiber connected to said tentative destination node device;

adding information on said relay node device to the information of the transit node device of said reserve packet stored in said storage section so as to update said reserve packet in response to the change of said transmission wavelength;

reading said updated reserve packet from said storage section and sending the same to one or two or more tentative destination node devices if said updated reserve packet exists; and readably storing a transmission count of said updated reserve packet in said storage section, wherein if a reserve failure packet is received from said tentative destination node device, a receive count of said reserve failure packet and said transmission count are compared;

wherein if said receive count and said transmission count are equal by said comparison, judging that a transmission possible node device does not exist is executed; and wherein if a transmission possible node device does not exist, or if a transmission wavelength does not exist, a new reserve failure packet which is different from said reserve failure packet is generated, and sent to the transmission source of said reserve packet.

14. A computer-readable medium, comprising software which executes the method according to claim 13.

15. An optical path reserve method executed in a start point node device when an optical path is set from said start point node device to an end point node device via a relay node device in an optical communication network which comprises a plurality of node devices including said start point node device, relay node device and end point node device, optical fibers connecting adjacent node devices for transmitting wavelength multiplexed signals, and a management device connected to each of said plurality of node devices, comprising the steps of:

receiving a reserve packet including information on said start point node device, said end point node device, transmission wavelength, and a transit node device, from said management device, to be stored in a storage section of said start point node device;

referring to an optical path state table which has been stored in a storage section of said start point node device in advance, and which indicates a setting state of an optical path switching section;

acquiring a transmission possible wavelength;

referring to a cost matrix which has been stored in said storage section in advance, and which indicates a transmission cost between said start point node device and each adjustment node device which is adjacent to said start point node device;

temporarily setting one or two or more transmission possible node devices, which are adjacent node devices, as destination node devices;

referring to a link state table which has been stored in said storage section in advance, and which indicates a wavelength being used for an optical fiber which performs transmission to said adjacent node device;

temporarily setting one or two or more wavelengths which are transmission possible wavelengths, and are not used in an optical fiber connected with said tentative destination node device as transmission wavelengths;

adding information on said temporarily set transmission wavelength to the information on transmission wavelength of said reserve packet stored in said storage section so as to update the reserve packet in response to the temporary setting of said transmission wavelength;

reading the updated reserve packet from said storage section;

sending the same to said one or two or more tentative destination node devices if said updated reserve packet exists; and storing a transmission count of said updated reserve packet in said storage section, wherein if a reserve failure packet is received from said tentative destination node device, a receive count of said reserve failure packet and said transmission count are compared;

wherein if said receive count and said transmission count are equal, judging that a transmission possible node device does not exist, is executed; and if a transmission possible node device does not exist, or if a transmission wavelength does not exist, a new reserve failure packet which is different from said reserve failure packet is generated, and sent to said management device.

16. A computer-readable medium, comprising software which executes the method according to claim 15.

17. An optical path reserve method executed in an end point node device when an optical path is set from a start point node device to said end point node device via a relay node device in an optical communication network which comprises a plurality of node devices including said start point node device, relay node device and end point node device, optical fibers connecting adjacent node devices for transmitting wavelength multiplexed signals, and a management device connected to each of said plurality of node devices, comprising the steps of:

receiving a reserve packet including information on said start point node device, end point node device, transmission wavelength and transit node device, from an adjacent node device which is adjacent to said end point node device, to be stored in a storage section of said end point node device; and judging whether bidirectional optical paths are reserved between said start point node device and said end point node device, wherein if bidirectional optical paths are reserved, a reserve completion packet is generated, and said reserve completion packet is sent to said management device, and if bidirectional optical paths are not reserved, said optical path reserve method further comprises the steps of:

setting an end point node device and a start point node device included in said reserve packet to a new start point node device and a new end point node device respectively to be added to said reserve packet;

referring to an optical path state table which has been stored in the storage section of said end point node device in advance, and which indicates a setting status of an optical path switching section;

acquiring a transmission possible wavelength;

referring to a cost matrix which has been stored in said storage section in advance, and which indicates a transmission cost between the end point node device which is said new start point node device and each adjacent node device;

temporarily setting one or two or more transmission possible node devices, which are said adjacent node devices, as destination node devices;

referring to a link state table which has been stored in said storage section in advance, and which indicates a wavelength used for an optical fiber which performs transmission to said adjacent node device;

temporarily setting one or two or more wavelengths which are transmission possible wavelengths and are not used for an optical fiber connected with. said tentative destination node device as transmission wavelengths;

adding information on said temporarily set transmission wavelength to the information on the transmission wavelength of said reserve packet stored in said storage section so as to update the reserve packet in response to the temporary setting of said transmission wavelength;

reading said updated reserve packet from said storage section and sending the same to said one or two or more tentative destination node devices if said updated reserve packet exists; and storing a transmission count of said updated reserve packet in said storage section, and wherein if a reserve failure packet is received from said tentative destination node device, a receive count of said reserve failure packet and said transmission count are compared;

wherein if said receive count and said transmission count are equal, judging that a transmission possible node device does not exist, is executed; and if a transmission possible node device does not exist, or if a transmission wavelength does not exist, a new reserve failure packet which is different from said reserve failure packet is generated, and sent to said management device.

18. A computer-readable medium, comprising software which executes the method according to claim 17.

* * * * *